United States Patent
Dimou et al.

(10) Patent No.: US 11,678,203 B2
(45) Date of Patent: Jun. 13, 2023

(54) LINK ADAPTATION UPON BEAM BLOCKING DETERMINATION

(71) Applicant: QUALCOMM Incorporated, San Diego, CA (US)

(72) Inventors: Konstantinos Dimou, San Francisco, CA (US); Yan Zhou, San Diego, CA (US); Tao Luo, San Diego, CA (US); Peter Gaal, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 59 days.

(21) Appl. No.: 17/317,683

(22) Filed: May 11, 2021

(65) Prior Publication Data

US 2021/0360435 A1   Nov. 18, 2021

Related U.S. Application Data

(60) Provisional application No. 63/024,265, filed on May 13, 2020.

(51) Int. Cl.
*H04W 16/28* (2009.01)
*H04L 1/1867* (2023.01)
*H04L 1/00* (2006.01)

(52) U.S. Cl.
CPC .......... *H04W 16/28* (2013.01); *H04L 1/0003* (2013.01); *H04L 1/189* (2013.01); *H04L 1/1896* (2013.01)

(58) Field of Classification Search
CPC ...... H04W 16/28; H04L 1/0003; H04L 1/189; H04L 1/1896; H04L 1/1893;
(Continued)

(56) References Cited

U.S. PATENT DOCUMENTS 11,425,775 B2 * 8/2022 Ganesan ............... H04W 76/19
2018/0227887 A1   8/2018 Hakola et al.
(Continued)

FOREIGN PATENT DOCUMENTS

WO   WO-2018140176 A1   8/2018
WO   WO-2019032882 A1   2/2019

OTHER PUBLICATIONS

AT&T: "Enhancements on Multi TRP Transmission", 3GPP TSG RAN WG1 #99, 3GPP Draft; R1-1912844, 3rd Generation Partnership Project (3GPP), Mobile Competence Centre, 650, Route Des Lucioles, F-06921 Sophia-Antipolis Cedex, France, vol. RAN WG1, No. Reno, NV; Nov. 18, 2019-Nov. 22, 2019, Nov. 8, 2019, (Nov. 8, 2019), pp. 1-8, XP051823642, Retrieved from the Internet: URL: https://www.3gpp.org/ftp/tsg_ran/WG1_RL1/TSGR1_99/Docs/R1-1912844.zip, R1-1912844 Remaining Issues on Multi-TRP Transmission Enhancements.docx, [retrieved on Nov. 8, 2019], Section 2.3.
(Continued)

*Primary Examiner* — Afshawn M Towfighi
(74) *Attorney, Agent, or Firm* — Holland & Hart LLP

(57) ABSTRACT

Methods, systems, and devices for wireless communications are described. For example, a method for wireless communications at a user equipment (UE), may include receiving a configuration for reporting feedback associated with beam blocking. The UE may perform a decoding process on one or more downlink transmissions via a set of multiple beams. The UE may determine whether a failure of the decoding process is a result of one or more of the plurality of beams being at least partially blocked during the one or more downlink transmissions according to the configuration. The UE may also transmit a negative acknowledgement (NACK) and link adaptation information, where the NACK acknowledgement is based on the failure of the decoding process and the link adaptation information is based on determining
(Continued)

whether the one or more of the set of multiple beams are at least partially blocked.

29 Claims, 20 Drawing Sheets

(58) Field of Classification Search
CPC ... H04L 1/0009; H04L 1/0025; H04L 1/0042; H04L 1/1671; H04B 7/0695
See application file for complete search history.

(56) References Cited

U.S. PATENT DOCUMENTS

| | | | |
|---|---|---|---|
| 2019/0190582 A1* | 6/2019 | Guo | H04W 72/046 |
| 2021/0105171 A1* | 4/2021 | Chen | H04B 7/0695 |
| 2022/0271876 A1* | 8/2022 | Elshafie | H04L 1/203 |
| 2022/0272555 A1* | 8/2022 | Bagheri | H04W 72/1273 |

OTHER PUBLICATIONS

International Search Report and Written Opinion—PCT/US2021/031931—ISA/EPO—dated Jul. 28, 2021.

* cited by examiner

LINK ADAPTATION UPON BEAM BLOCKING DETERMINATION

CROSS REFERENCE

The present Application for Patent claims the benefit of U.S. Provisional Patent Application No. 63/024,265 by Dimou et al., entitled "LINK ADAPTATION UPON BEAM BLOCKING DETERMINATION," filed May 13, 2020, assigned to the assignee hereof, and expressly incorporated by reference herein.

FIELD OF TECHNOLOGY

The following relates generally to wireless communications and more specifically to link adaptation upon beam blocking determination.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

In some wireless communications systems, a UE may report feedback to a base station based on a decoding outcome of a communication at the UE. For example, the UE may transmit a positive acknowledgement (ACK) when the decoding is successful, or the UE may transmit a negative acknowledgement (NACK) when the decoding is unsuccessful. In some examples, a base station may clear a retransmission buffer based on receiving an ACK. A base station may also determine to retransmit the communication associated with the feedback based on receiving a NACK. ACK/NACK information, however, may not allow the base station to determine why the decoding of the initial communication was unsuccessful. Thus, the base station may not adjust communication parameters of the retransmission efficiently. As a result, improved techniques may be desired for ensuring efficient retransmission for improved quality of communications.

SUMMARY

The described techniques relate to improved methods, systems, devices, and apparatuses that support link adaptation upon beam blocking determination. Generally, the described techniques provide for efficient link adaptation based on additional feedback information, for example, during ultra-reliable communications. A user equipment (UE) may be configured by the network to report feedback such as a positive acknowledgement (ACK) or negative acknowledgement (NACK). The configuration may also include parameters to be used by the UE for beam blocking detection and reporting. For example, a UE may be configured to report beam blocking detection results with a NACK when decoding is unsuccessful. The beam blocking detection results may allow for optimized link adaptation at the UE and base station by allowing the UE to share link information (e.g., detection of complete or partial beam blocking) with the base station. The beam blocking detection may be based on detection of a reference signal, for example, a beam blocking detection reference signal. In some cases, the UE may use one or more thresholds to determine the extent of beam blocking (e.g., complete, partial, or no beam blocking).

A method of wireless communications at a UE is described. The method may include receiving a configuration for reporting feedback associated with beam blocking, performing a decoding process on one or more downlink transmissions received via a set of multiple beams, determining whether a failure of the decoding process is a result of one or more of the set of multiple beams being at least partially blocked during the one or more downlink transmissions according to the configuration, and transmitting a NACK and link adaptation information, where the NACK is based on the failure of the decoding process and the link adaptation information is based on determining whether the one or more of the set of multiple beams are at least partially blocked.

An apparatus for wireless communications at a UE is described. The apparatus may include a processor, memory coupled with the processor, and instructions stored in the memory. The instructions may be executable by the processor to cause the apparatus to receive a configuration for reporting feedback associated with beam blocking, perform a decoding process on one or more downlink transmissions received via a set of multiple beams, determine whether a failure of the decoding process is a result of one or more of the set of multiple beams being at least partially blocked during the one or more downlink transmissions according to the configuration, and transmit a NACK and link adaptation information, where the NACK is based on the failure of the decoding process and the link adaptation information is based on determining whether the one or more of the set of multiple beams are at least partially blocked.

Another apparatus for wireless communications at a UE is described. The apparatus may include means for receiving a configuration for reporting feedback associated with beam blocking, means for performing a decoding process on one or more downlink transmissions received via a set of multiple beams, means for determining whether a failure of the decoding process is a result of one or more of the set of multiple beams being at least partially blocked during the one or more downlink transmissions according to the configuration, and means for transmitting a NACK and link adaptation information, where the NACK is based on the failure of the decoding process and the link adaptation information is based on determining whether the one or more of the set of multiple beams are at least partially blocked.

A non-transitory computer-readable medium storing code for wireless communications at a UE is described. The code may include instructions executable by a processor to receive a configuration for reporting feedback associated with beam blocking, perform a decoding process on one or more downlink transmissions received via a set of multiple beams, determine whether a failure of the decoding process is a result of one or more of the set of multiple beams being at least partially blocked during the one or more downlink transmissions according to the configuration, and transmit a NACK and link adaptation information, where the NACK is based on the failure of the decoding process and the link adaptation information is based on determining whether the one or more of the set of multiple beams are at least partially blocked.

Some examples of the method, apparatuses, and non-transitory computer-readable medium described herein may further include operations, features, means, or instructions for receiving a reference signal, where the determining whether the failure of the decoding process may be the result of the one or more of the set of multiple beams being at least partially blocked during the one or more downlink transmissions according to the configuration may be based on the reference signal, where the determining whether the failure of the decoding process may be the result of the one or more of the set of multiple beams being at least partially blocked during the one or more downlink transmissions according to the configuration includes, comparing a receive power of the reference signal to a threshold, and determining that the one or more of the set of multiple beams may be blocked based on the receive power satisfying the threshold (e.g., the receive power being less than the threshold, or the receive power being less than or equal to the threshold).

Some examples of the method, apparatuses, and non-transitory computer-readable medium described herein may further include operations, features, means, or instructions for receiving a reference signal, where the determining whether the failure of the decoding process may be the result of the one or more of the set of multiple beams being at least partially blocked during the one or more downlink transmissions according to the configuration may be based on the reference signal, where the determining whether the failure of the decoding process may be the result of the one or more of the set of multiple beams being at least partially blocked during the one or more downlink transmissions according to the configuration includes, comparing a receive power of the reference signal to a first threshold and a second threshold, and determining that the one or more of the set of multiple beams may be partially blocked based on the receive power satisfying the first threshold and the second threshold (e.g., the receive power being greater than the first threshold and less than the second threshold, or the receive power being greater than or equal to the first threshold and less than or equal to the second threshold).

Some examples of the method, apparatuses, and non-transitory computer-readable medium described herein may further include operations, features, means, or instructions for receiving a reference signal, where the determining whether the failure of the decoding process may be the result of the one or more of the set of multiple beams being at least partially blocked during the one or more downlink transmissions according to the configuration includes, comparing a receive power of the reference signal to a first threshold and a second threshold, and determining that the one or more of the set of multiple beams may be not partially blocked based on the receive power satisfying the first threshold and the second threshold (e.g., the receive power being greater than the first threshold and greater than the second threshold, or the receive power being greater than or equal to the first threshold and greater than or equal to the second threshold).

In some examples of the method, apparatuses, and non-transitory computer-readable medium described herein, transmitting the NACK and the link adaptation information may include operations, features, means, or instructions for transmitting, via a set of multiple uplink beams in a beam sweep, the NACK and the link adaptation information based on determining whether the one or more of the set of multiple beams may be at least partially blocked.

In some examples of the method, apparatuses, and non-transitory computer-readable medium described herein, the link adaptation information includes at least one of a request for at least one new downlink beam, a request for at least one new downlink beam and reuse of a modulation and coding scheme (MCS), or a request for a new MCS and reuse of the set of multiple beams.

In some examples of the method, apparatuses, and non-transitory computer-readable medium described herein, a single control channel message includes the NACK and the link adaptation information.

In some examples of the method, apparatuses, and non-transitory computer-readable medium described herein, transmitting the NACK and the link adaptation information may include operations, features, means, or instructions for transmitting the NACK in a first control channel message and transmitting the link adaptation information in a second control channel message.

In some examples of the method, apparatuses, and non-transitory computer-readable medium described herein, receiving the configuration for reporting feedback associated with beam blocking may include operations, features, means, or instructions for receiving a radio resource control (RRC) message including an information element (IE) for reporting feedback associated with beam blocking.

In some examples of the method, apparatuses, and non-transitory computer-readable medium described herein, the one or more downlink transmissions may be semi-persistent transmissions received via the set of multiple beams.

A method of wireless communications at a base station is described. The method may include transmitting a configuration for reporting feedback associated with beam blocking, transmitting one or more downlink transmissions via a set of multiple beams, receiving a NACK and link adaptation information according to the configuration, where the NACK is based on a failure of a decoding process and the link adaptation information is associated with at least one of the set of multiple beams, determining to retransmit at least one of the one or more downlink transmissions based on the NACK, and adjusting a communication parameter for retransmission of the at least one of the one or more downlink transmissions based on the link adaptation information.

An apparatus for wireless communications at a base station is described. The apparatus may include a processor, memory coupled with the processor, and instructions stored in the memory. The instructions may be executable by the processor to cause the apparatus to transmit a configuration for reporting feedback associated with beam blocking, transmit one or more downlink transmissions via a set of multiple beams, receive a NACK and link adaptation information according to the configuration, where the NACK is based on a failure of a decoding process and the link adaptation information is associated with at least one of the set of multiple beams, determine to retransmit at least one of the one or more downlink transmissions based on the NACK, and adjust a communication parameter for retransmission of the at least one of the one or more downlink transmissions based on the link adaptation information.

Another apparatus for wireless communications at a base station is described. The apparatus may include means for transmitting a configuration for reporting feedback associated with beam blocking, means for transmitting one or more downlink transmissions via a set of multiple beams, means for receiving a NACK and link adaptation information according to the configuration, where the NACK is based on a failure of a decoding process and the link adaptation information is associated with at least one of the set of multiple beams, means for determining to retransmit at least one of the one or more downlink transmissions based on the NACK, and means for adjusting a communication parameter for retransmission of the at least one of the one or more downlink transmissions based on the link adaptation information.

A non-transitory computer-readable medium storing code for wireless communications at a base station is described. The code may include instructions executable by a processor to transmit a configuration for reporting feedback associated with beam blocking, transmit one or more downlink transmissions via a set of multiple beams, receive a NACK and link adaptation information according to the configuration, where the NACK is based on a failure of a decoding process and the link adaptation information is associated with at least one of the set of multiple beams, determine to retransmit at least one of the one or more downlink transmissions based on the NACK, and adjust a communication parameter for retransmission of the at least one of the one or more downlink transmissions based on the link adaptation information.

Some examples of the method, apparatuses, and non-transitory computer-readable medium described herein may further include operations, features, means, or instructions for performing a downlink beam sweep procedure for the retransmission of the at least one of the one or more downlink transmissions based on the NACK and the link adaptation information.

In some examples of the method, apparatuses, and non-transitory computer-readable medium described herein, the configuration for reporting feedback associated with beam blocking includes a first threshold associated with a beam blocking determination and a second threshold associated with a partial beam blocking determination.

In some examples of the method, apparatuses, and non-transitory computer-readable medium described herein, receiving the NACK and the link adaptation information may include operations, features, means, or instructions for receiving, via at least one of a set of multiple uplink beams of a beam sweep, the NACK and the link adaptation information based on whether the one or more of the set of multiple beams may be at least partially blocked.

In some examples of the method, apparatuses, and non-transitory computer-readable medium described herein, the link adaptation information includes a request for at least one new downlink beam, and the communication parameter includes at least one transmission configuration indicator (TCI) state.

In some examples of the method, apparatuses, and non-transitory computer-readable medium described herein, the link adaptation information includes a request for at least one new downlink beam and reuse of an MCS, and the communication parameter includes at least one TCI state.

In some examples of the method, apparatuses, and non-transitory computer-readable medium described herein, the link adaptation information includes a request for updating an MCS and reuse of the set of multiple beams, and the communication parameter includes the MCS.

In some examples of the method, apparatuses, and non-transitory computer-readable medium described herein, a single control information message includes the NACK and the link adaptation information.

In some examples of the method, apparatuses, and non-transitory computer-readable medium described herein, receiving the NACK and the link adaptation information may include operations, features, means, or instructions for receiving the NACK in a first control channel message and receiving the link adaptation information in a second control channel message.

In some examples of the method, apparatuses, and non-transitory computer-readable medium described herein, transmitting the configuration for reporting feedback associated with beam blocking may include operations, features, means, or instructions for transmitting an RRC message including an IE for reporting feedback associated with beam blocking.

DETAILED DESCRIPTION

Figure 1:
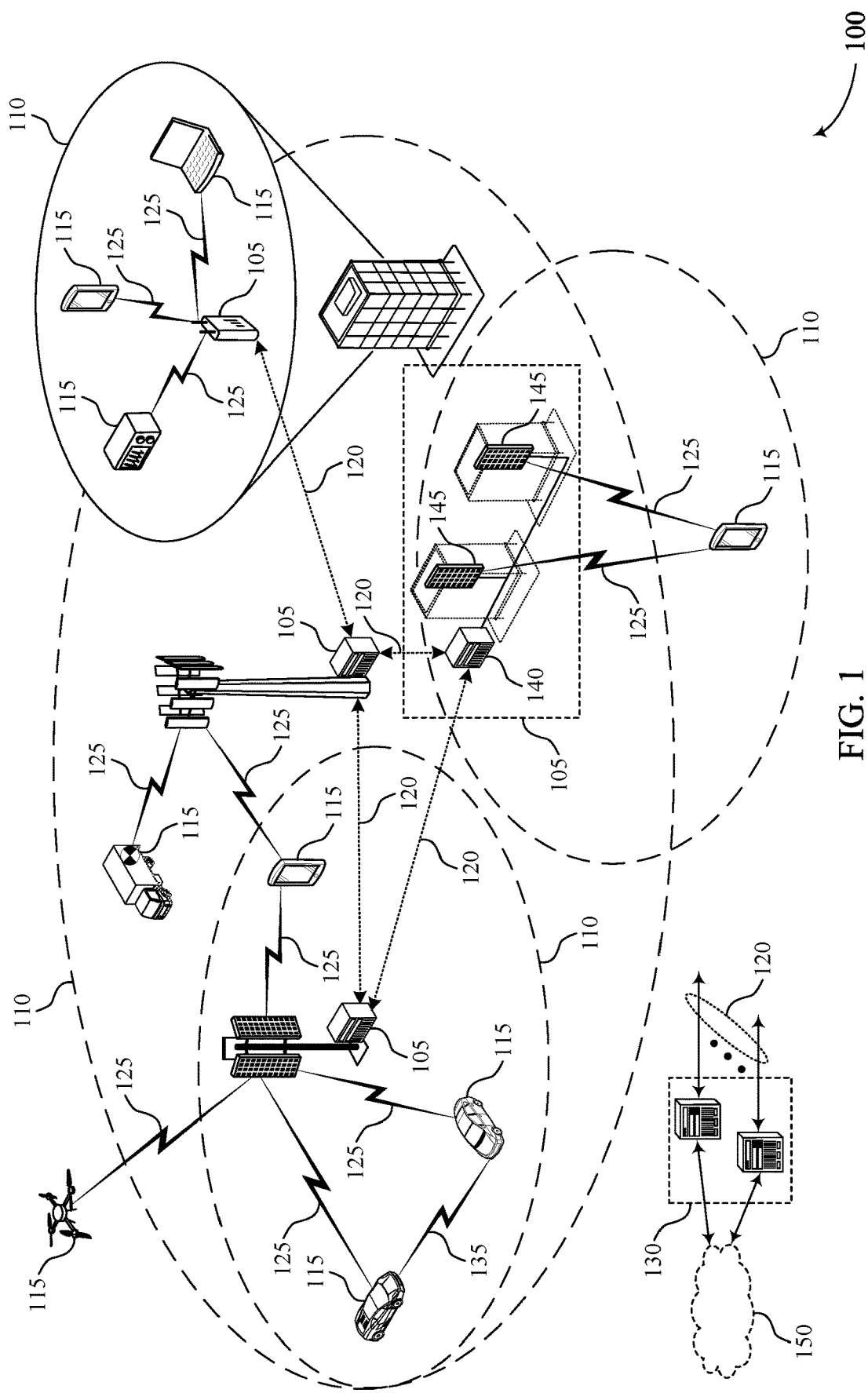
FIG. 1 illustrates an example of a wireless communications system that supports link adaptation upon beam blocking determination in accordance with aspects of the present disclosure.

A user equipment (UE) may be configured to perform beam blocking detection and to include additional information in feedback for improved link adaptation based on the beam blocking detection. Conventionally, a base station may receive a negative acknowledgement (NACK) from a UE indicating that the UE was unable to successfully decode a transmission from the base station. The base station may be capable of adapting the modulation and coding scheme (MCS), the resource block group (RBG), and the transmission configuration indicator (TCI) state (e.g., beam) to attempt a successful retransmission. The base station, however, may not be able to determine why the transmission was not decoded successfully. As a result, the base station may determine a link adaptation without sufficient information about the failure from the UE. This link adaptation may be excessive or unable to improve the link between the base station and the UE. For example, a base station may unnecessarily determine to perform a beam sweep to switch to a new beam based on receiving a NACK from the UE. The decoding failure at the UE may have been due to temporary interference from a neighbor cell. Thus, a retransmission from the base station on the same beam in a different resource would have been a better link adaptation than switching beams as the beam switch consumed excessive power.

As described herein, the inefficient link adaptation described above may be avoided by configuring a UE to include link adaptation information in addition to NACK feedback. For example, the link adaptation information may be based on a beam blocking detection procedure. A UE may attempt to decode a physical downlink shared channel (PDSCH). If the UE is able to decode the PDSCH successfully, the UE may transmit a positive acknowledgement (ACK) to the base station. If the UE is unable to decode the PDSCH successfully, then the UE may perform a beam blocking evaluation based on a reference signal. In some cases, the reference signal may be a beam blocking detection reference signal such as, but not limited to a demodulation reference signal (DM-RS), a phase-tracking reference signal (PT-RS), or a channel state information reference signal (CSI-RS). For instance, the UE may determine if complete beam blocking occurred during the transmission. If complete beam blocking occurred, the UE may include a request for a new downlink beam from the base station for retransmission along with a NACK sent via an uplink beam sweep. If complete beam blocking did not occur, then the UE may evaluate if partial beam blocking occurred and adapt the NACK transmission and link adaptation information based on the evaluation. In some examples, a UE may assume beam reciprocity between uplink transmit beams and downlink receive beams at the UE such that the UE may determine the link adaptation for the uplink transmit beam based on the decoding attempt associated with a downlink receive beam. The downlink transmissions from the base station may be semi-persistently scheduled transmissions from multiple transmission reception points (TRPs). In some cases, the UE may be operating in an ultra-reliable low latency configuration.

A UE and base station may avoid unnecessary power consuming procedures (e.g., beam sweeping) when configured for beam blocking detection. The configuration of beam blocking detection and reporting may allow the UE and base station to communicate with improved reliability when compared to no beam blocking detection and reporting based on informed beam switching that results in reduced errors. Accordingly, there may be improved system spectral efficiency due to less interference from less beam switching and fewer retransmissions.

Aspects of the disclosure are initially described in the context of wireless communications systems. Aspects of the disclosure are further illustrated by and described with reference to apparatus diagrams, system diagrams, and flowcharts that relate to link adaptation upon beam blocking determination.

FIG. 1 illustrates an example of a wireless communications system 100 that supports link adaptation upon beam blocking determination in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORE-SET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI-RS), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some cases, UE 115 may be configured (e.g., via an RRC message) to determine if beam blocking is detected when decoding is unsuccessful. The determination may be based on a number of configured or determined signal power thresholds. The UE 115 may also be configured to report suggested link adaptation based on the beam blocking determination. As described herein, UE 115 may indicate the link adaptation information with NACK feedback. More specifically, UE 115 may attempt to decode a PDSCH from a base station 105. If the UE 115 is able to decode the PDSCH successfully, then the UE 115 may transmit an ACK to the base station 105. If the UE 115 is unable to decode the PDSCH successfully, then the UE 115 may perform a beam blocking evaluation based on a reference signal (e.g., CRS, CSI-RS, beam blocking detection reference signal).

For instance, the UE 115 may determine if complete beam blocking occurred during the transmission based on a first power threshold. If complete beam blocking occurred, the UE 115 may include a request for a new downlink beam from the base station for retransmission along with a NACK sent via an uplink beam sweep. If complete beam blocking did not occur, then the UE 115 may assess if partial beam blocking occurred based on a second power threshold. Then, UE 115 may adjust the NACK transmission and link adaptation information based on the evaluation. The base station 105 may receive the NACK and link adaptation information and perform a retransmission using adjusted communicating parameters, such as MCS and TCI state, based on the link adaptation information.

Figure 2:
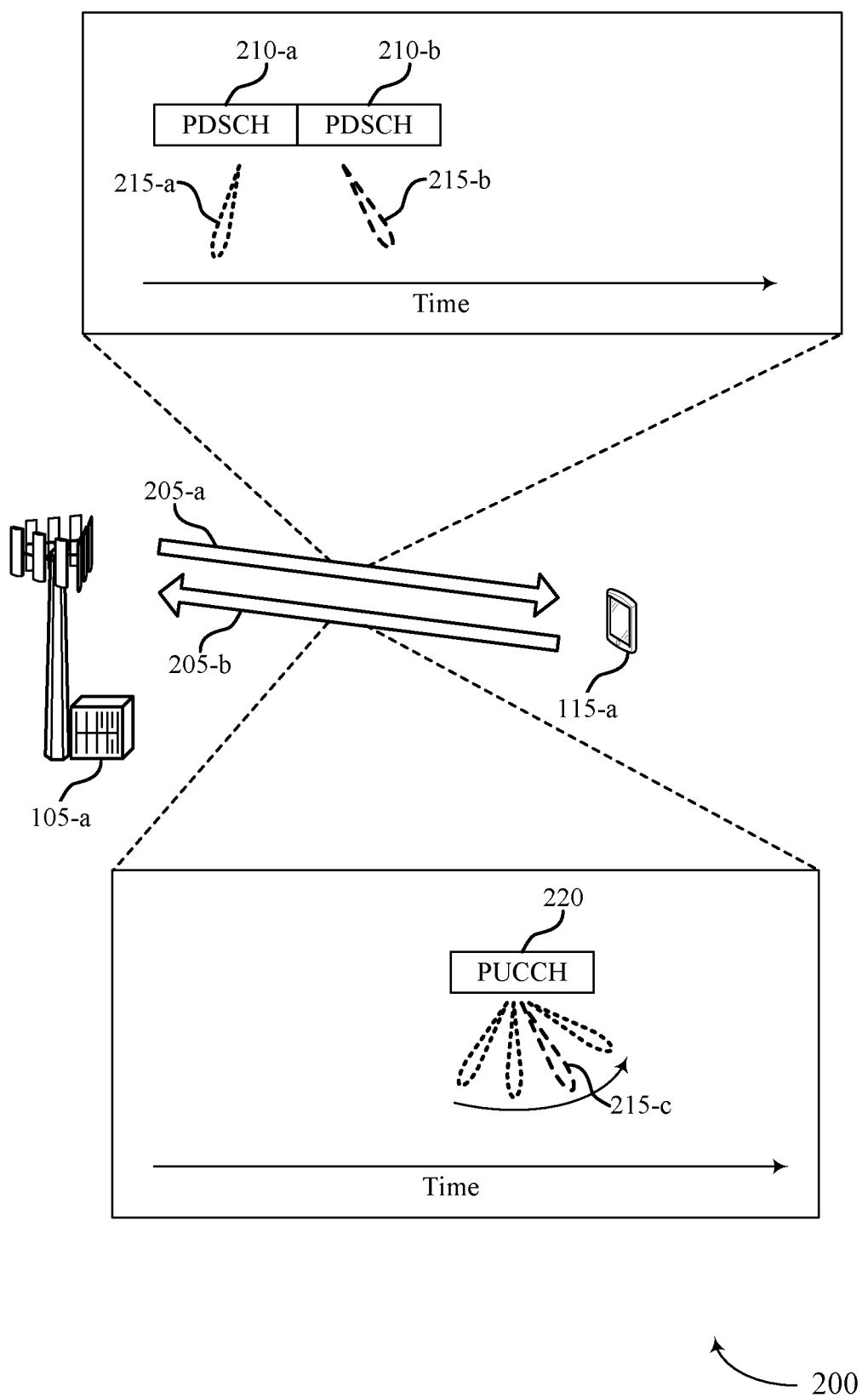
FIG. 2 illustrates an example of a wireless communications system that supports link adaptation upon beam blocking determination in accordance with aspects of the present disclosure.

FIG. 2 illustrates an example of a wireless communications system 200 that supports link adaptation upon beam blocking determination in accordance with aspects of the present disclosure. In some examples, wireless communications system 200 may implement aspects of wireless communications system 100. Wireless communications system 200 may include UE 115-a and base station 105-a, which may be respective examples of a UE 115 and a base station 105, as described with reference to FIG. 1.

In wireless communications system 200, base station 105-a and UE 115-a may be in communication with one another. For example, base station 105-a may transmit information to UE 115-a on downlink 205-a, and UE 115-a may transmit information to base station 105-a on uplink 205-b. Base station 105-a may configure UE 115-a (e.g., via an RRC message) to perform beam blocking detection and report the findings of the detection back to the base station 105-a with feedback (e.g., ACK and NACK). For example, an information element (IE) may be included in an RRC message, such as a channel state information (CSI) measurement configuration RRC message or a different configuration message. The configuration may include parameters to use for beam blocking detection, such as one or more power thresholds or when to transmit NACK via uplink beam sweeping. In some examples, downlink 205-a and uplink 205-b may be configured for ultra-reliable low latency communications.

Base station 105-a may transmit PDSCH 210 using multiple TRPs. Specifically, a first transmission of PDSCH 210-a may be transmitted at a first time via beam 215-a, and a second transmission of PDSCH 210-b may be transmitted at a second time via beam 215-b. The transmissions PDSCH 210-a and 210-b may include the same data packet and may both be assigned a same sequence number. In some examples, PDSCH 210 may be semi-persistently scheduled by base station 105-a, and wireless communications system 200 may be an internet of things (IoT) system that communicates semi-persistently using a small packet size periodically (e.g., every N milliseconds (ms)). In some cases, the traffic may not change in the IoT system.

UE 115-a may attempt to decode PDSCH 210. For example, UE 115-a may attempt a joint decoding of PDSCH 210-a and 210-b. In some cases, UE 115-a may not be able to successfully decode the PDSCH 210. Unsuccessful decoding may be a result of beam blocking, downlink interference, cross link interference, fading, as well as many other reasons. Accordingly, the UE 115-a may evaluate if the decoding failure was due to beam blocking of downlink 205-a. For example, the UE 115-a may determine if complete beam blocking occurred during the transmission of PDSCH 210 based on a first power threshold (e.g., layer 1 or layer 3 reference signal receive power (RSRP)). If complete beam blocking occurred, the UE 115-a may report the blocking (e.g., in a CSI-RS report) and request a new downlink beam from the base station 105-a for retransmission along with a NACK in physical uplink control channel (PUCCH) 220. In some cases, the UE 115-a may send the request and NACK in a single control channel message (e.g., via PUCCH 220). In some cases, the single control channel message may be a single PUCCH format. In some cases, the UE 115-a may send the request and NACK in different control channel messages. In some cases, the UE 115-a may send the PUCCH 220 via an uplink beam sweep 215-c.

If complete beam blocking did not occur, then the UE 115-a may determine if partial beam blocking occurred based on a second power threshold (e.g., layer 1 or layer 3 RSRP). Then, UE 115-a may adjust the NACK transmission and link adaptation information in PUCCH 220 based on the evaluation. For example, if UE 115-a determines partial beam blocking occurred, then the UE 115-a may use a power threshold to determine if the PUCCH 220 including the NACK should be transmitted using an uplink beam sweep 215-*c*. Additionally, or alternatively, if UE 115-*a* determines partial beam blocking occurred, then the UE 115-*a* may request either a lower MCS relative to the MCS used for PDSCH 210 and a same downlink beam, or the same or different MCS for retransmission on a new beam different from beams 215-*a* and 215-*b*. In another example, if the UE 115-*a* determines that complete or partial beam blocking did not occur, then the UE 115-*a* may report this information with the NACK of PUCCH 220 or a CSI-RS report to base station 105-*a* (e.g., in a same control channel message as the NACK or CSI-RS). In some cases, the report and the NACK may be sent in a single PUCCH format. In some cases, the UE 115-*a* may send the report and NACK in different control channel messages. This determination may indicate that the decoding failure was a result of slow fading or downlink interference from another cell, which may benefit from a lower MCS but may not benefit from a new beam.

The base station 105-*a* may receive the NACK and link adaptation information via the PUCCH 220 or via the CSI-RS report. Consequently, the base station 105-*a* may perform a retransmission using adjusted communicating parameters, such as MCS or TCI state, based on the link adaptation information. Thus, the base station 105-*a* may make an informed decision about what link adaptation actions to take to efficiently retransmit to UE 115-*a*.

Figure 3:
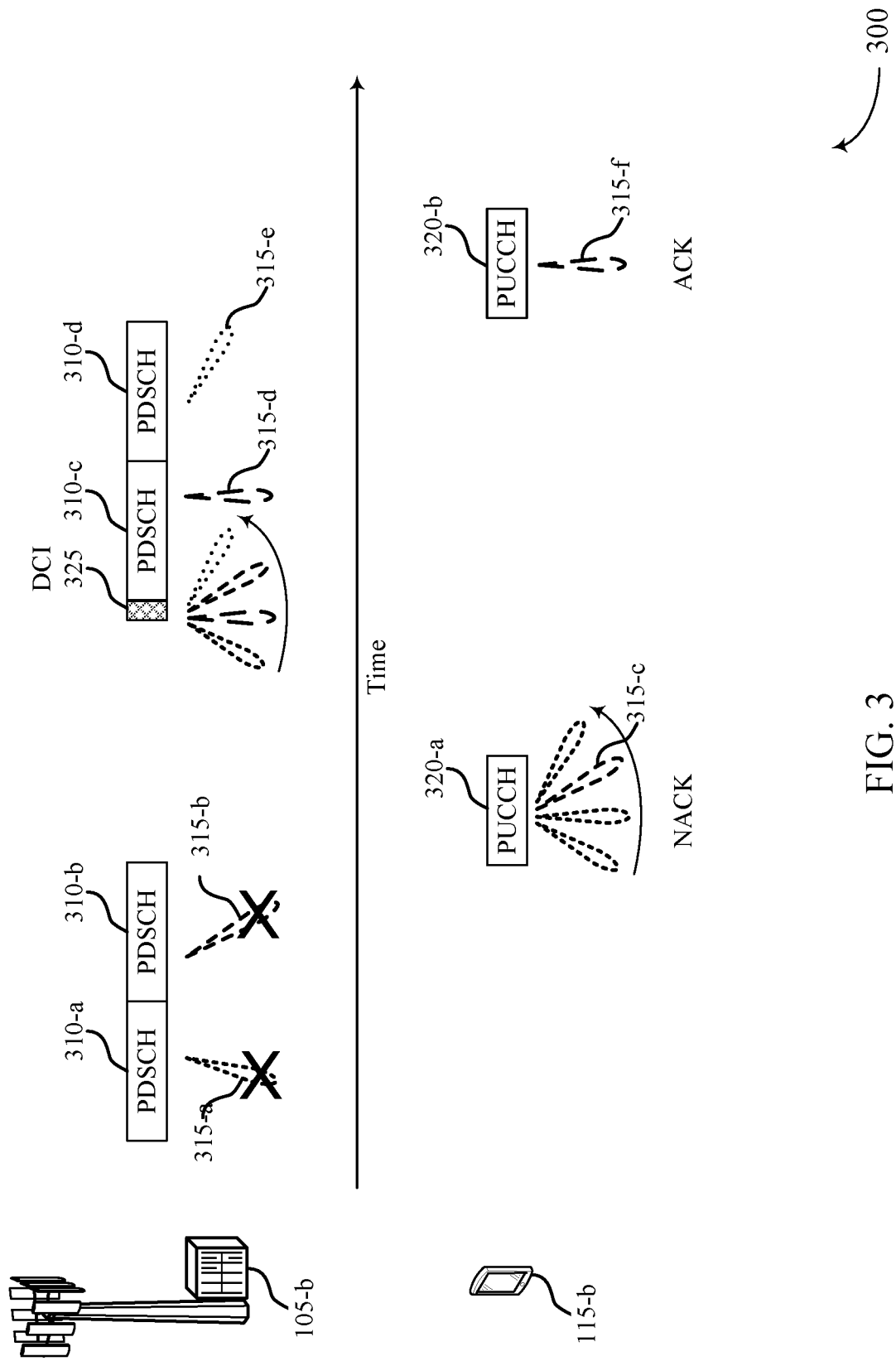
FIG. 3 illustrates an example of a timeline that supports link adaptation upon beam blocking determination in accordance with aspects of the present disclosure.

FIG. 3 illustrates an example of a timeline 300 that supports link adaptation upon beam blocking determination in accordance with aspects of the present disclosure. In some examples, timeline 300 may implement aspects of wireless communications system 100. Timeline 300 may include UE 115-*b* and base station 105-*b*, which may be respective examples of a UE 115 and a base station 105, as described with reference to FIGS. 1 and 2.

As described above with reference to FIG. 2, base station 105-*b* may attempt a multi-TRP transmission of PDSCH 310-*a* and 310-*b*, via respective beams 315-*a* and 315-*b*, to UE 115-*b*. UE 115-*b* may perform a decoding procedure for PDSCH 310-*a* and 310-*b*, but the decoding may be unsuccessful. Accordingly, the UE 115-*b* may perform a beam blocking detection procedure to determine link adaptation information to indicate to base station 105-*b* with the NACK in PUCCH 320-*a*.

For example, UE 115-*b* may determine that complete beam blocking caused the decoding failure if one or more of Equations 1 through 5 are true. For example, beam blocking may occur when Equations 1 and 2 are true and Equations 3 through 5 are not available (e.g., layer-3 measurements are unavailable), when Equations 1 through 4 are true and Equation 5 is not available, or when Equations 1 through 5 are true. More specifically, the UE may evaluate Equation 1 at a first time instance:

$$L1\_RSRP_{averageSystemBandwidth} < L1\_RSRP_{Threshold1} \quad (1)$$

Also, the UE may evaluate Equation 2 at a first time instance:

$$\max(L1\_RSRP_{ResourceBlock}) < L1\_RSRP_{Threshold2} \quad (2)$$

Additionally, or alternatively, the UE may evaluate Equation 3 using an average taken over the coherence time:

$$L3\_RSRP_{averageSystemBandwidth} < L3\_RSRP_{Threshold3} \quad (3)$$

Additionally, or alternatively, the UE may evaluate Equation 4 using an average taken over the coherence time:

$$\max(L3\_RSRP_{ResourceBlock}) < L3\_RSRP_{Threshold4} \quad (4)$$

Additionally, or alternatively, the UE may evaluate Equation 5 when the difference between the first time instance and the starting time is greater than the coherence time:

$$L1_{RSRP_{t1}} - L1_{RSRP_{t0}} < L1_{RSRP_{Drop_{Threshold5}}} \quad (5)$$

When beam blocking occurred based on the conditions above, then UE 115-*b* may transmit PUCCH 320-*a* with the NACK and link adaptation information indicating blocking occurred via an uplink beam sweep.

When the beam blocking conditions above are false, then the UE 115-*b* may evaluate if partial beam blocking occurred. For example, UE 115-*b* may determine that partial beam blocking caused the decoding failure if one or more of Equations 6 through 10 are true. For example, partial beam blocking may occur when Equations 1 and 2 are false, Equations 6 and 7 are false, and Equations 3 through 5 and 8 through 10 are not available. In another example, partial beam blocking may occur when Equations 1 through 4 are false, Equations 6 through 9 are true, and Equations 5 and 10 are not available. In yet another example, partial beam blocking may occur when Equations 1 through 5 are false and Equations 6 through 10 are true. More specifically, the UE may evaluate Equations 1 and 6 at a first time instance:

$$L1\_RSRP_{averageSystemBandwidth} < L1\_RSRP_{Threshold1a} \quad (6)$$

Also, the UE may evaluate Equations 2 and 7 at a first time instance:

$$\max(L1\_RSRP_{ResourceBlock}) < L1\_RSRP_{Threshold2a} \quad (7)$$

Additionally, or alternatively, the UE may evaluate Equations 3 and 8 using an average taken over the coherence time:

$$L3\_RSRP_{averageSystemBandwidth} < L3\_RSRP_{Threshold3a} \quad (8)$$

Additionally, or alternatively, the UE may evaluate Equations 4 and 9 using an average taken over the coherence time:

$$\max(L3\_RSRP_{ResourceBlock}) < L3\_RSRP_{Threshold4a} \quad (9)$$

Additionally, or alternatively, the UE may evaluate Equations 5 and 10 when the difference between the first time instant and the starting time is greater than the coherence time:

$$L1\_RSRP_{t1} - L1\_RSRP_{t0} < L1\_RSRP\_Drop_{Threshold5a} \quad (10)$$

When partial beam blocking occurred based on the conditions above, then UE 115-*b* may evaluate if the layer 1 RSRP of a beam blocking detection reference signal is above a first threshold. If the layer 1 RSRP of the beam blocking detection reference signal is above the first threshold, then the UE 115-*b* may transmit PUCCH 320-*a* with the NACK and link adaptation information indicating partial blocking occurred on beam 315-*c* without an uplink beam sweep. If the layer 1 RSRP of the beam blocking detection reference signal is not above the first threshold, then the UE 115-*b* may transmit PUCCH 320-*a* with the NACK and link adaptation information indicating partial blocking occurred with an uplink beam sweep.

In some cases, the link adaptation information in PUCCH 320-*a* may request a new downlink beam. Accordingly, base station 105-*b* may transmit downlink control information (DCI) 325 via a downlink beam sweep to select two new beams, beams 315-*d* and 315-*e* respectively, for retransmission of PDSCH 310-*c* and 310-*d*. Additionally, or alternatively, the base station 105-*b* may update the MCS used for retransmission of PDSCH 310-*c* and 310-*d*. Upon UE request for lower MCS, in case already the lowest MCS is used, UE may request repetitions in time as a measure for link adaptation. Thus, the base station 105-*b* may determine how to adapt the communication parameters for the link with UE 115-*b* to successfully retransmit PDSCH 310-*c* and 310-*d*. UE 115-*b* may successfully decode one or both of PDSCH 310-*c* and 310-*d*, and UE 115-*b* may respond by transmitting an ACK in PUCCH 320-*b* on beam 315-*f* without beam sweeping.

In some examples, UE 115-*b* upon at least partial beam blocking detection, may request a new beam for the downlink retransmission in general. In case of several downlink beams being activated and whose signal strength is measured, then the UE 115-*b* may indicate a preferred downlink beam (e.g., TCI State ID) to base station 105-*b*.

Figure 4:
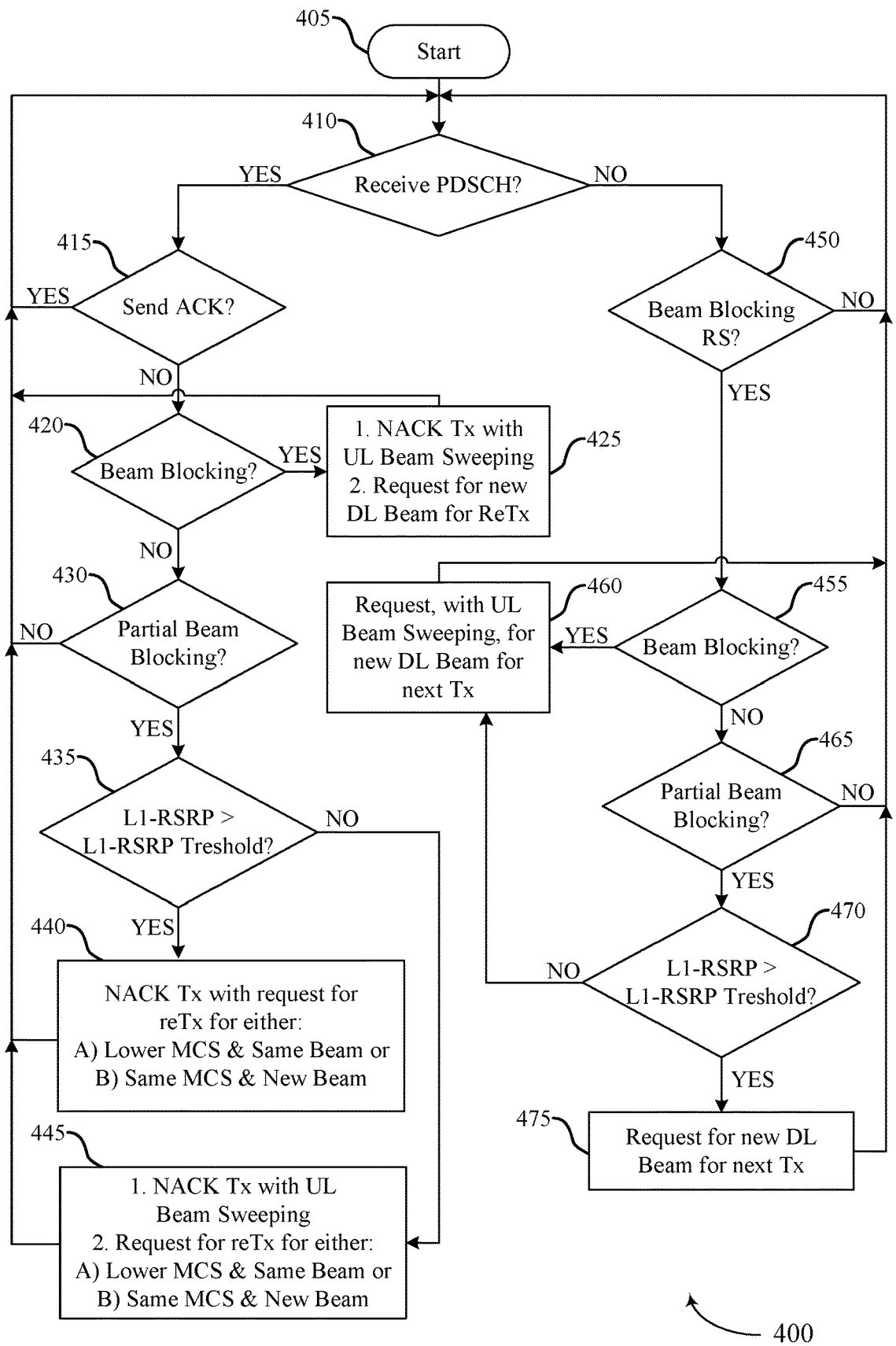
FIG. 4 illustrates an example of a flowchart that supports link adaptation upon beam blocking determination in accordance with aspects of the present disclosure.

FIG. 4 illustrates an example of a flowchart 400 that supports link adaptation upon beam blocking determination in accordance with aspects of the present disclosure. In some examples, flowchart 400 may implement aspects of wireless communications system 100. Flowchart 400 may be a beam blocking detection procedure implemented at a UE such as UE 115 as described with reference to FIGS. 1 through 3.

At 405, the UE may start an example of a beam blocking detection operation. The beam blocking detection operation may be included as part of other beam management operations. At 410, UE may determine if the UE was able to receive at least a portion of a PDSCH. If the UE was able to receive at least a portion of a PDSCH, then the UE proceeds to 415. But, if the UE was not able to receive at least a portion of a PDSCH or could not determine if the base station transmitted a PDSCH, then the UE may proceed to 450.

At 415, the UE may determine if the PDSCH can be correctly decoded. If the decoding is successful, then the UE may transmit an ACK and return to the beginning of the flowchart. If the decoding is unsuccessful, then the UE may not send an ACK and proceed to 420.

At 420, the UE may determine if the decoding failure was due to beam blocking. For example, the UE may determine that one or more of equations 1 through 5 are true. If there was beam blocking, then the UE proceeds to 425. At 425, the UE may transmit NACK with an uplink beam sweeping procedure and may request a new downlink beam for retransmissions by the base station. If the UE determines that one or more of equations 1 through 5 are false, then the UE may determine that there was not total beam blocking and proceed to 430.

At 430, the UE may determine if the decoding failure was due to partial beam blocking. For example, the UE may determine if one or more of equations 1 through 5 are false and if one or more of equations 6 through 10 are true. If one or more of equations 1 through 5 are false and the associated equation from equations 6 through 10 is also false, then the UE may determine there was no partial beam blocking and return to the beginning of the flowchart. If the UE determines that one or more of equations 1 through 5 are false and that the associated condition from one or more of equations 6 through 10 are true, then the UE may determine that that the decoding failure was at least partially due to partial beam blocking and proceed to 435.

At 435, the UE may evaluate if the layer 1 RSRP observed for the PDSCH and the beam blocking detection reference signal is above a layer 1 RSRP threshold. If the layer 1 RSRP is above the threshold, then the UE may proceed to 440. If the layer 1 RSRP is equal to or below the threshold, then the UE may proceed to 445.

At 440, the UE may transmit NACK without an uplink beam sweeping procedure and may request one of: a lower MCS and a same downlink beam for retransmission relative to the evaluated transmission, or a same MCS and a new downlink beam for retransmission relative to the evaluated transmission. Upon UE request for lower MCS, in case already the lowest MCS is used, UE may request repetitions in time as a measure for link adaptation.

At 445, the UE may transmit NACK with an uplink beam sweeping procedure and may request one of: a lower MCS and a same downlink beam for retransmission relative to the evaluated transmission, or a same MCS and a new downlink beam for retransmission relative to the evaluated transmission. Upon UE request for lower MCS, in case already the lowest MCS is used, UE may request repetitions in time as a measure for link adaptation.

At 450, the UE may determine if it received a beam blocking reference signal. If the UE did not receive a beam blocking reference signal, then the UE may return to the beginning of the flowchart. If the UE did receive a beam blocking reference signal, then the UE may proceed to 455.

At 455, the UE may determine if the beam blocking reference signal experienced beam blocking. For example, the UE may determine that one or more of equations 1 through 5 are true for the reference signal. If there was beam blocking, then the UE proceeds to 460. At 460, the UE may request a new downlink beam for retransmissions with an uplink beam sweeping procedure. If the UE determines that one or more of equations 1 through 5 are false for the reference signal, then the UE may determine that there was not total beam blocking and proceed to 465.

At 465, the UE may determine if the beam blocking reference signal experienced partial beam blocking. For example, the UE may determine, for the reference signal, if one or more of equations 1 through 5 are false and if one or more of equations 6 through 10 are true. If one or more of equations 1 through 5 are false and the associated equation from equations 6 through 10 is also false, then the UE may determine there was no partial beam blocking and return to the beginning of the flowchart. If the UE determines that one or more of equations 1 through 5 are false and that the associated condition from one or more of equations 6 through 10 are true, then the UE may determine that that the beam blocking reference signal experienced partial beam blocking and proceed to 470.

At 470, the UE may evaluate if the layer 1 RSRP observed for the beam blocking detection reference signal is above a layer 1 RSRP threshold. If the layer 1 RSRP is above the threshold, then the UE may proceed to 475. If the layer 1 RSRP is equal to or below the threshold, then the UE may proceed to 460.

At 475, the UE may request a new downlink beam for retransmissions without an uplink beam sweeping procedure.

Figure 5:
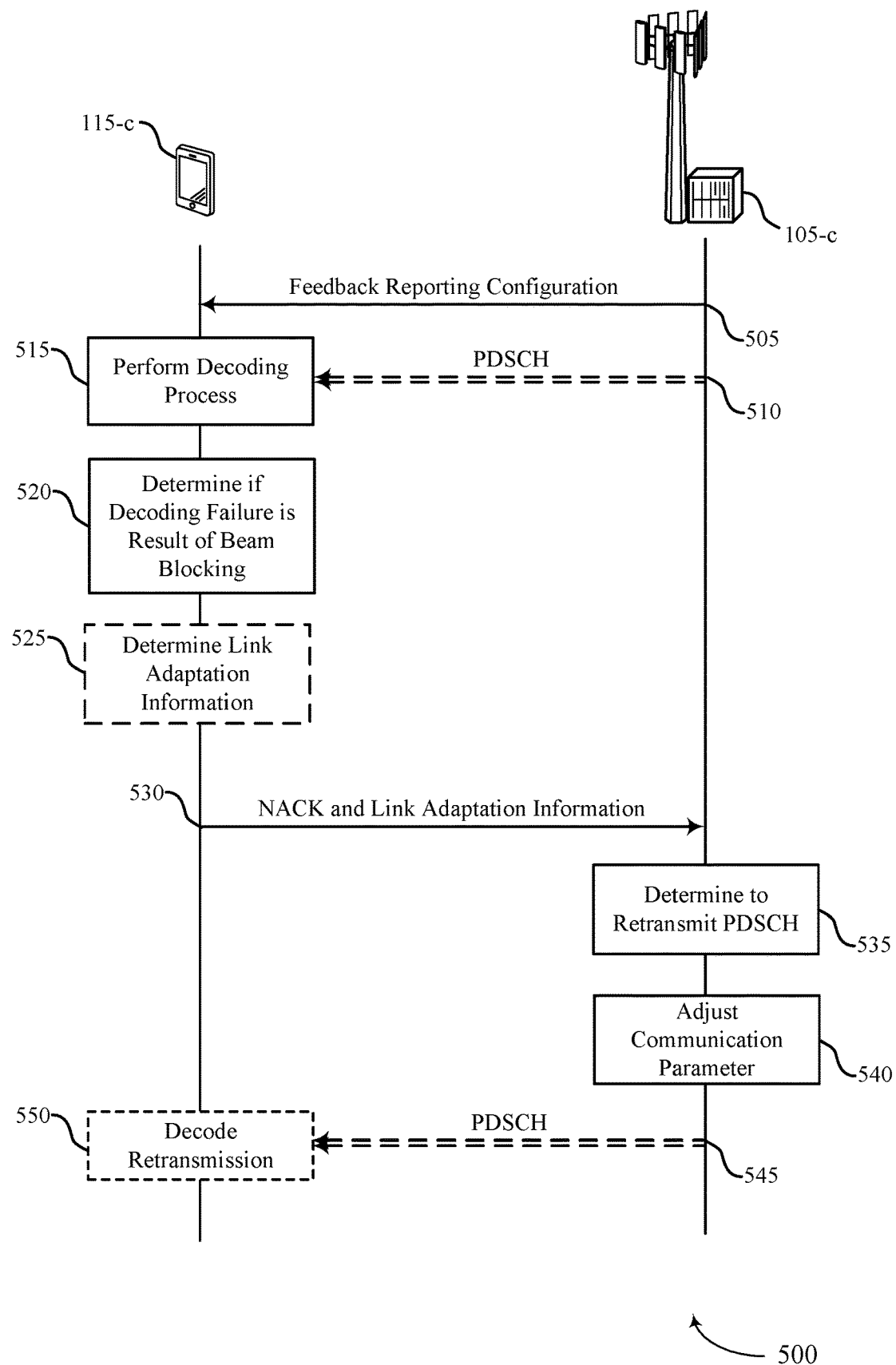
FIG. 5 illustrates an example of a process flow that supports link adaptation upon beam blocking determination in accordance with aspects of the present disclosure.

FIG. 5 illustrates an example of a process flow 500 that supports link adaptation upon beam blocking determination in accordance with aspects of the present disclosure. In some examples, process flow 500 may implement aspects of wireless communications system 100. Process flow 500 is shown as being implemented by a UE 115-*c*, which may be an example of the UEs 115 as described with respect to FIGS. 1 and 2. For example, UE 115-*c* may be an example of UE 115-*a* of FIG. 2 or UE 115-*b* of FIG. 3. Process flow 500 is also shown as being implemented by base station 105-*c*, which may be an example of the base stations 105 as described with respect to FIGS. 1 and 2. For example, base station 105-*c* may be an example of base station 105-*a* of FIG. 2 or base station 105-*b* of FIG. 3.

In the following description of the process flow 500, the operations of UE 115-*c* and base station 105-*c* may occur in a different order than the exemplary order shown. Certain illustrated operations may also be left out of the process flow 500, or other operations may be added to the process flow 500. It is to be understood that while UE 115-*c* and base station 105-*c* are shown performing a number of the operations of process flow 500, any wireless device may perform the operations shown. The configuration for reporting feedback associated with beam blocking may include a first threshold associated with a beam blocking determination and a second threshold associated with a partial beam blocking determination At 505, base station 105-*c* may transmit and UE 115-*c* may receive a configuration for reporting feedback associated with beam blocking. For example, the configuration may be included in an IE of an RRC message.

At 510, base station 105-*c* may transmit a PDSCH via a plurality of beams. In some examples, the PDSCH may be transmitted with a reference signal that may be configured for the UE 115-*c* to detect beam blocking (e.g., beam blocking detection reference signal). UE 115-*c* may receive the beam blocking detection reference signal, wherein the determining whether the failure of the decoding process is the result of the one or more of the plurality of transmit beams being at least partially blocked during the downlink transmission according to the configuration at 520 is based at least in part on the beam blocking detection reference signal. In some cases, the PDSCH may be a semi-persistently scheduled transmission.

At 515, UE 115-*c* may attempt to perform a decoding process on a least one of a plurality of downlink transmissions transmitted via a respective plurality of transmission beams.

At 520, UE 115-*c* may determine whether a failure of the decoding process at 515 is a result of one or more of the plurality of transmit beams at 510 being at least partially blocked during the downlink transmission according to the configuration received at 505. In some examples, the determining may include comparing a receive power of the beam blocking detection reference signal to a threshold and determining that the one or more of the plurality of transmit beams are blocked based at least in part on the receive power being less than the threshold. In other examples, the determining may include comparing a receive power of the beam blocking detection reference signal to a first threshold and a second threshold and determining that the one or more of the plurality of transmit beams are partially blocked based at least in part on the receive power being greater than the first threshold and less than the second threshold. In yet another example, the determining may include comparing a receive power of the beam blocking detection reference signal to a first threshold and a second threshold and determining that the one or more of the plurality of transmit beams are not partially blocked based at least in part on the receive power being greater than the first threshold and greater than the second threshold.

At 525, UE 115-*c* may determine link adaptation information based on the outcome of evaluating at 520 whether beam blocking occurred. In some examples, the link adaptation information includes a request for at least one new downlink beam. In some cases, the link adaptation information includes a request for at least one new downlink beam and reuse of an MCS. In other cases, the link adaptation information comprises a request for a new MCS and reuse of the plurality of transmission beams.

At 530, UE 115-*c* may transmit and base station 105-*c* may receive a NACK and link adaptation information, where the NACK is based at least in part on the failure of the decoding process at 515 and the link adaptation information is based at least in part on determining whether the one or more of the plurality of transmit beams are at least partially blocked at 520. In some cases, UE 115-*c* may transmit, via a plurality of uplink beams in a beam sweep, the NACK and the link adaptation information based at least in part on determining whether the one or more of the plurality of transmit beams are at least partially blocked. In some examples, a single control channel message includes the NACK and the link adaptation information. For example, the UE 115-*c* may transmit an uplink control message (e.g., PUCCH) including multiple bits of link adaptation information indicating one or more of a request for a retransmission, modification of MCS, or a request for a new beam. In some examples, the uplink control message may include a set of bits that may indicate one of a set of combinations of requests (e.g., a first value may indicate modification of MCS, a second value may indicate a request for a new beam, a third value may indicate a request for a new beam with modification of MCS). In other examples, the NACK may be transmitted in a first control channel message, and the link adaptation information may be transmitted in a second, different control channel message.

At 535, base station 105-*c* may determine to retransmit at least one of the plurality of downlink transmissions from 510 based at least in part on the NACK received at 530.

At 540, base station 105-*c* may adjust a communication parameter for retransmission of the at least one of the plurality of downlink transmissions at 545 based at least in part on the link adaptation information received at 530. For example, base station 105-*c* may perform a downlink beam sweep procedure for the retransmission of the at least one of the plurality of downlink transmissions based at least in part on the NACK and the link adaptation information. Additionally, or alternatively, base station 105-*c* may use a different beam for the retransmission, may modify an MCS for the retransmission, or may send multiple repetitions of the retransmissions if the MCS is already at a lowest level.

At 545, base station 105-*c* may retransmit the at least one of the plurality of downlink transmissions according to the communication parameter.

At 550, UE 115-*c* may decode the retransmission successfully.

Figure 6:
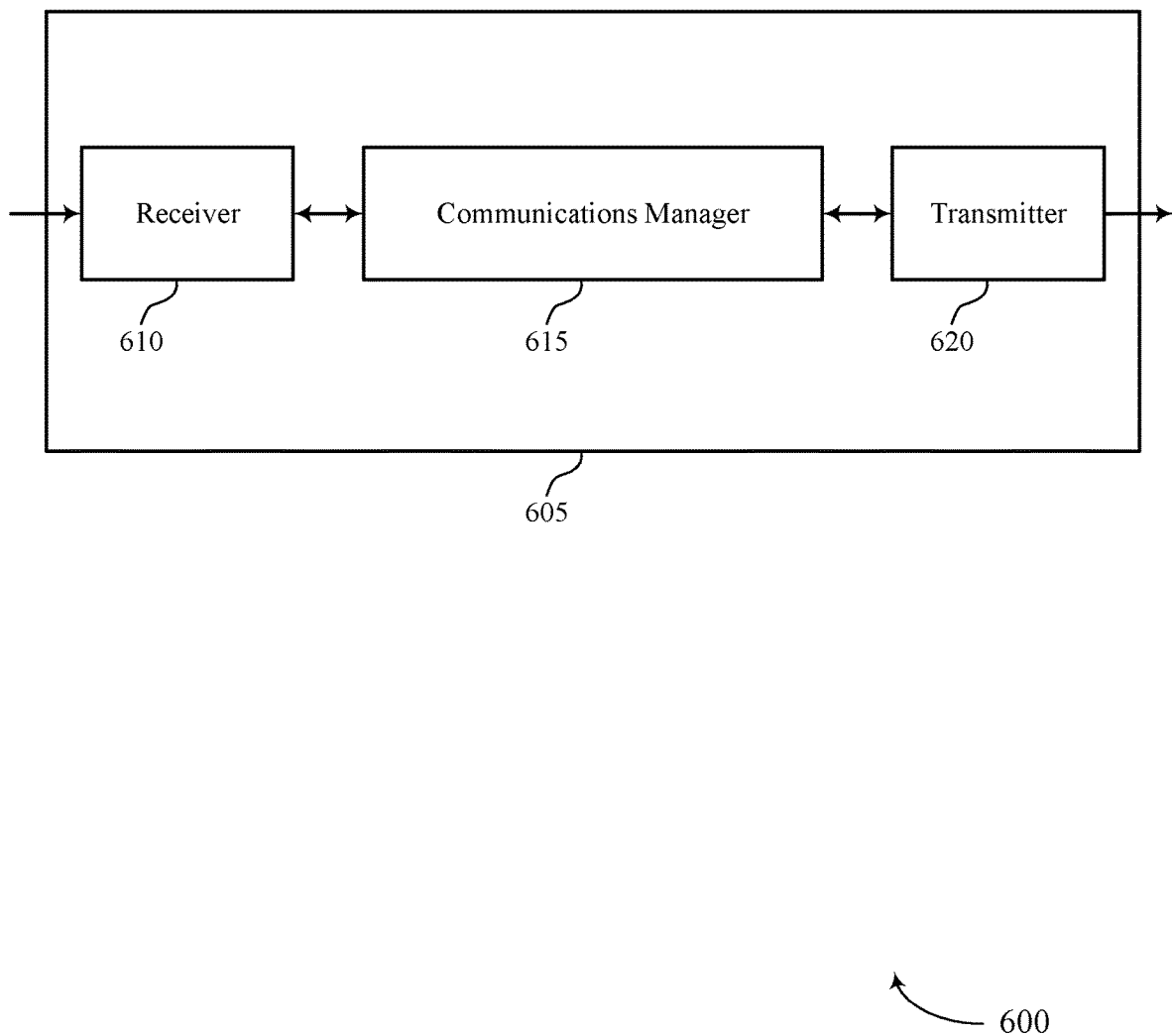
FIGS. 6 and 7 show block diagrams of devices that support link adaptation upon beam blocking determination in accordance with aspects of the present disclosure.

FIG. 6 shows a block diagram 600 of a device 605 that supports link adaptation upon beam blocking determination in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to link adaptation upon beam blocking determination, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may receive a configuration for reporting feedback associated with beam blocking, performing a decoding process on one or more downlink transmissions received via a set of multiple beams, perform a decoding process on one or more downlink transmissions received via a set of multiple beams, determine whether a failure of the decoding process is a result of one or more of the set of multiple beams being at least partially blocked during the one or more downlink transmissions according to the configuration, and transmit a NACK and link adaptation information, where the NACK is based on the failure of the decoding process and the link adaptation information is based on determining whether the one or more of the set of multiple beams are at least partially blocked. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
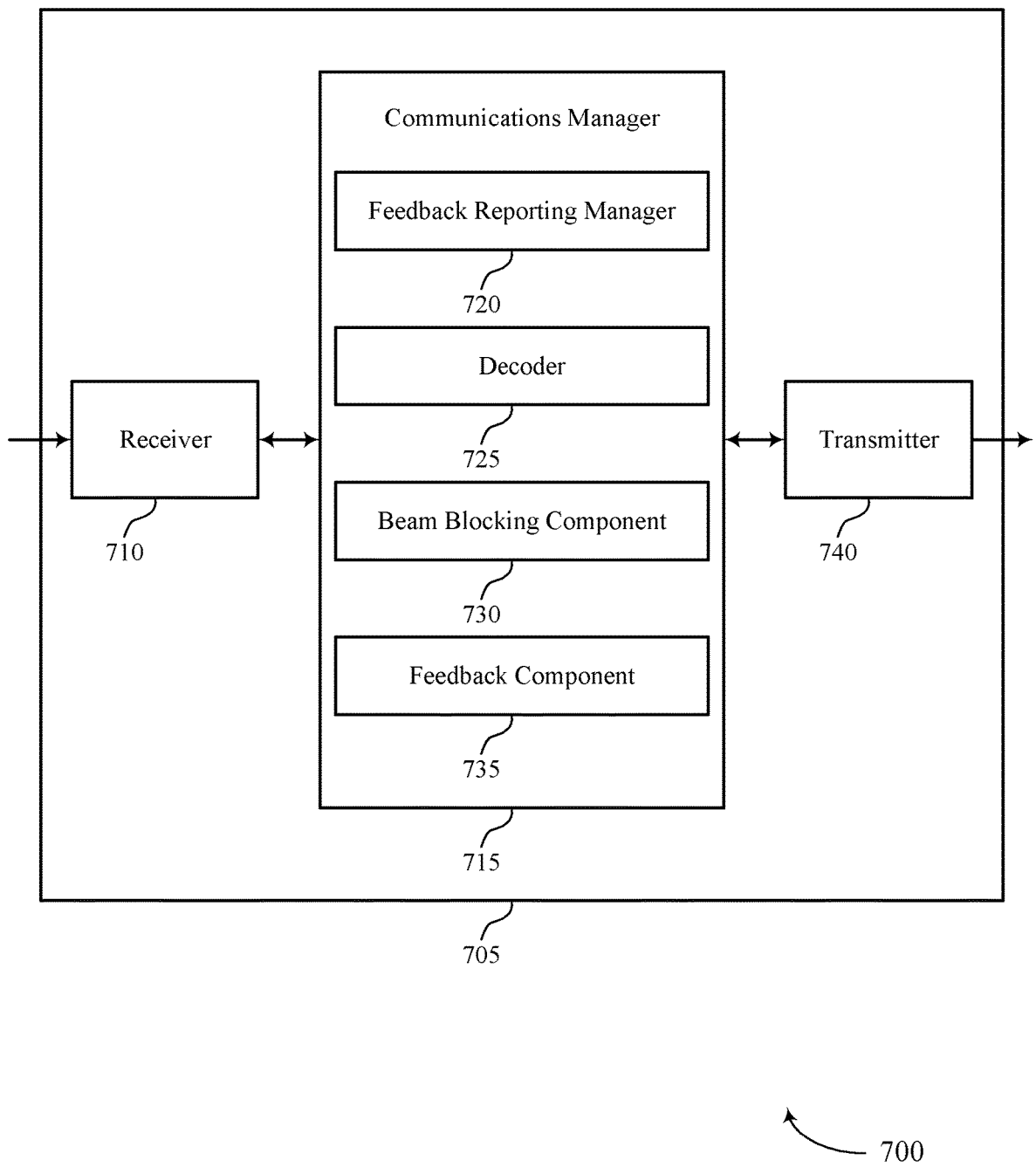

FIG. 7 shows a block diagram 700 of a device 705 that supports link adaptation upon beam blocking determination in accordance with aspects of the present disclosure. The device 705 may be an example of aspects of a device 605, or a UE 115 as described herein. The device 705 may include a receiver 710, a communications manager 715, and a transmitter 740. The device 705 may also include a processor. Each of these components may be in communication with one another (e.g., via one or more buses).

The receiver 710 may receive information such as packets, user data, or control information associated with various information channels (e.g., control channels, data channels, and information related to link adaptation upon beam blocking determination, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a feedback reporting manager 720, a decoder 725, a beam blocking component 730, and a feedback component 735. The communications manager 715 may be an example of aspects of the communications manager 910 described herein.

The feedback reporting manager 720 may receive a configuration for reporting feedback associated with beam blocking. The decoder 725 may perform a decoding process on one or more downlink transmissions received via a set of multiple beams (e.g., where the one or more downlink transmissions may be transmitted via a respective set of transmit beams from a base station). The beam blocking component 730 may determine whether a failure of the decoding process is a result of one or more of the set of multiple beams being at least partially blocked during the one or more downlink transmissions according to the configuration. The feedback component 735 may transmit a NACK and link adaptation information, where the NACK is based on the failure of the decoding process and the link adaptation information is based on determining whether the one or more of the set of multiple beams are at least partially blocked.

The transmitter 740 may transmit signals generated by other components of the device 705. In some examples, the transmitter 740 may be collocated with a receiver 710 in a transceiver module. For example, the transmitter 740 may be an example of aspects of the transceiver 920 described with reference to FIG. 9. The transmitter 740 may utilize a single antenna or a set of antennas.

Figure 8:
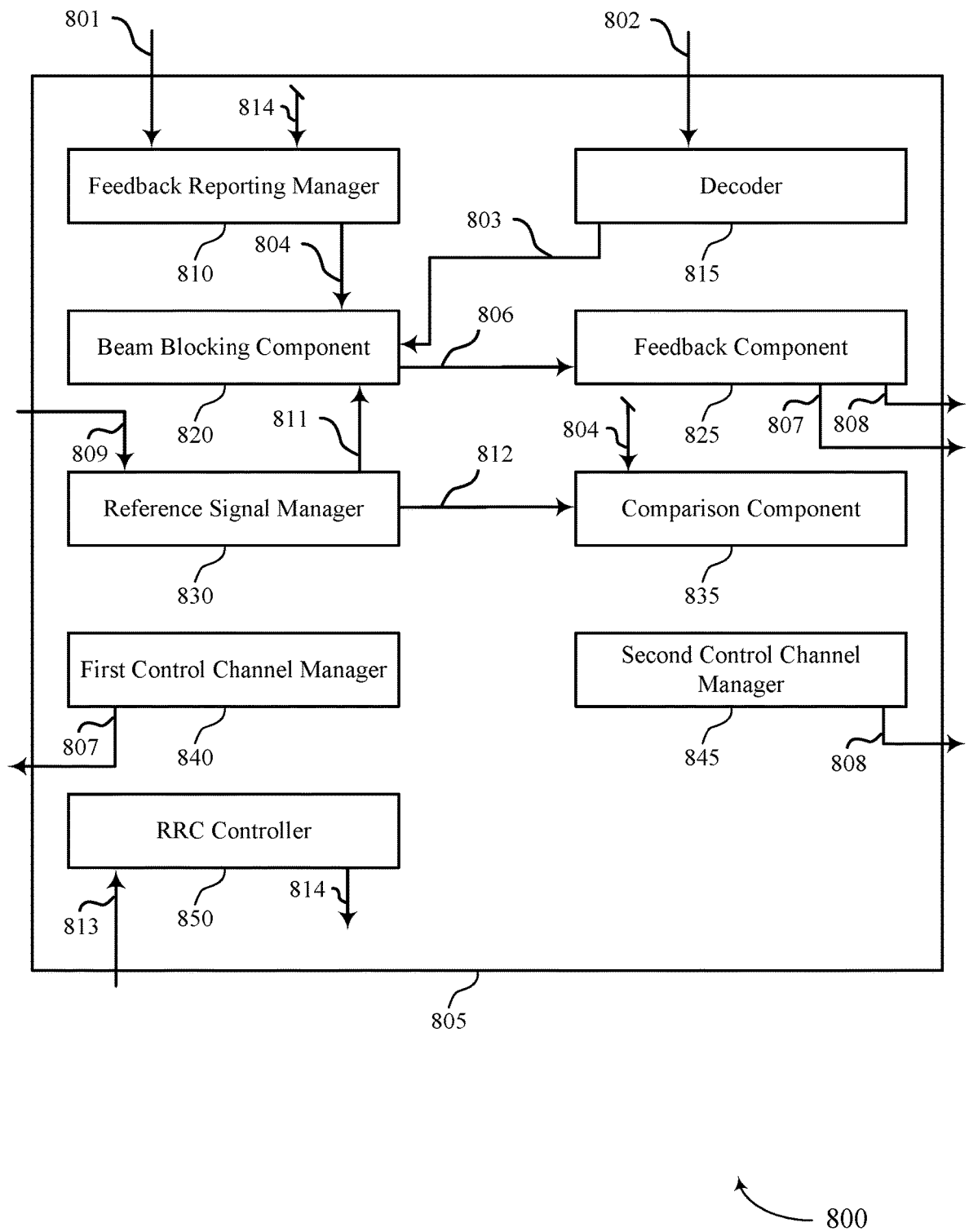
FIG. 8 shows a block diagram of a communications manager that supports link adaptation upon beam blocking determination in accordance with aspects of the present disclosure.

FIG. 8 shows a block diagram 800 of a communications manager 805 that supports link adaptation upon beam blocking determination in accordance with aspects of the present disclosure. The communications manager 805 may be an example of aspects of a communications manager 615, a communications manager 715, or a communications manager 910 described herein. The communications manager 805 may include a feedback reporting manager 810, a decoder 815, a beam blocking component 820, a feedback component 825, a reference signal manager 830, a comparison component 835, a first control channel manager 840, a second control channel manager 845, and a RRC controller 850. Each of these modules may communicate, directly or indirectly, with one another (e.g., via one or more buses).

The feedback reporting manager 810 may receive a configuration 801 for reporting feedback associated with beam blocking. For example, feedback reporting manager 810 may obtain configuration 801 via receiver 710. In some cases, the configuration 801 may be included in an IE of an RRC message. For example, feedback reporting manager 810 may obtain IE information 814 from the RRC controller 850. In some cases, the configuration 801 may be included in a message received from lower layers (e.g., a layer lower than an RRC protocol layer such as a MAC control element (MAC CE) received from a MAC protocol layer).

The decoder 815 may perform a decoding process on one or more downlink transmissions received via a set of multiple beams. For example, decoder 815 may obtain information 802 via receiver 710 corresponding to a demodulation of one or more beams from a base station and may decode the information 802. The one or more beams from a base station may correspond to a PDSCH transmission intended for a device supported by communications manager 805. In some cases, the set of downlink transmissions may transmitted semi-persistently via the one or more beams from the base station.

The beam blocking component 820 may determine whether a failure of the decoding process is a result of one or more of the set of multiple beams being at least partially blocked during the one or more downlink transmissions according to the configuration 801. For example, blocking component 820 may obtain decoded information 803 from decoder 815. Blocking component 820 may compare decoded information 803 with configuration information 804 obtained from feedback reporting manager 810 to make a determination regarding beam blocking. In some cases, configuration information 804 may include one or more thresholds. In some examples, the beam blocking component 820 may determine that the one or more of the set of beams are blocked based on the receive power being less than the threshold. In some examples, the beam blocking component 820 may determine that the one or more of the set of beams are blocked based on the receive power being less than or equal to the threshold. In some examples, the beam blocking component 820 may determine that the one or more of the set of beams are partially blocked based on the receive power being greater than the first threshold and less than the second threshold. In some examples, the beam blocking component 820 may determine that the one or more of the set of beams are partially blocked based on the receive power being greater than or equal to the first threshold and less than or equal to the second threshold. In some examples, the beam blocking component 820 may determine that the one or more of the set of beams are not partially blocked based on the receive power being greater than the first threshold and greater than the second threshold. In some examples, the beam blocking component 820 may determine that the one or more of the set of beams are not partially blocked based on the receive power being greater than or equal to the first threshold and greater than or equal to the second threshold.

The feedback component 825 may transmit a NACK 807 and link adaptation information 808, where the NACK 807 is based on the failure of the decoding process and the link adaptation information is based on determining whether the one or more of the set of multiple beams are at least partially blocked. In some cases, the feedback component 825 may obtain beam blocking information 806 from beam blocking component 820 and pass the NACK 807 and link adaptation information 808 to transmitter 740, which may transmit signals corresponding to NACK 807 and link adaptation information 808 to the base station. In some examples, the feedback component 825 may transmit, via a set of uplink beams in a beam sweep, the NACK 807 and the link adaptation information 808 based on determining whether the one or more of the set of beams are at least partially blocked. In some cases, the link adaptation information 808 includes a request for at least one new downlink beam. In some cases, the link adaptation information 808 includes a request for at least one new downlink beam and reuse of an MCS. In some cases, the link adaptation information 808 includes a request for a new MCS and reuse of the set of multiple beams. In some cases, a single control channel message includes the NACK 807 and the link adaptation information 808.

The reference signal manager 830 may receive a reference signal 809, where the determining whether the failure of the decoding process is the result of the one or more of the set of multiple beams being at least partially blocked during the downlink transmission according to the configuration 801 is based on the reference signal 809. In some examples, the reference signal manager 830 may obtain reference signal 809 via receiver 710. In some examples, beam blocking component 820 may determine whether a failure of the decoding process is a result of one or more of the set of multiple beams being at least partially blocked during the downlink transmission according to the configuration information 804 obtained from feedback reporting manager 810 and reference signal information 811 obtained from the reference signal manager 830.

The comparison component 835 may compare a receive power of the reference signal 809 to a threshold. For example, the comparison component 835 may obtain receive power information 812 from the reference signal manager 830. The comparison component 835 may obtain a threshold provided in the configuration information 804 from feedback reporting manager 810 for comparing the receive power information 812 of the reference signal 809 to the threshold. In some examples, the comparison component 835 may compare a receive power of the reference signal 809 to a first threshold and a second threshold. In some cases, the comparison component 835 may obtain the first threshold and the second threshold in the configuration information 804 from feedback reporting manager 810. The comparison component 835 may compare the receive power information 812 of the reference signal 809 to the first threshold and the second threshold.

The first control channel manager 840 may transmit the NACK 807 in a first control channel message. For example, first control channel manager 840 may pass the NACK 807 to transmitter 740, which may transmit signals corresponding to NACK 807 to the base station.

The second control channel manager 845 may transmit the link adaptation information in a second control channel message. For example, second control channel manager 845 may pass the link adaptation information 808 to transmitter 740, which may transmit signals corresponding to link adaptation information 808 to the base station.

The RRC controller 850 may receive a RRC message 813 including an IE for reporting feedback associated with beam blocking. For example, the RRC controller 850 may obtain RRC message 813 via receiver 710. In some cases, the RRC controller 850 may pass IE information 814 to feedback reporting manager 810. In some cases, the IE information 814 may provide the configuration 801 for reporting feedback associated with beam blocking.

Figure 9:
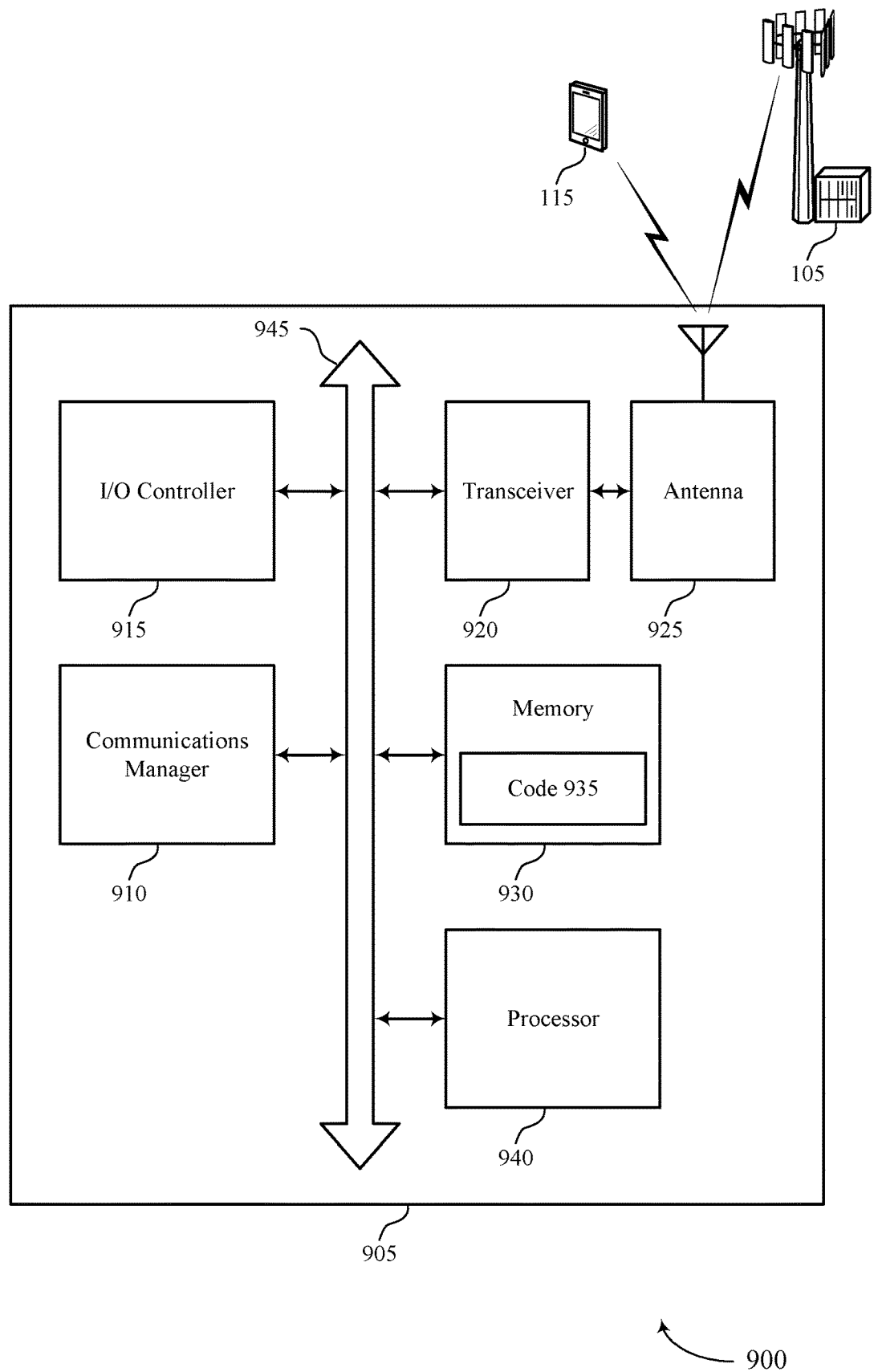
FIG. 9 shows a diagram of a system including a device that supports link adaptation upon beam blocking determination in accordance with aspects of the present disclosure.

FIG. 9 shows a diagram of a system 900 including a device 905 that supports link adaptation upon beam blocking determination in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may receive a configuration for reporting feedback associated with beam blocking, perform a decoding process on one or more downlink transmissions received via a set of multiple beams, determine whether a failure of the decoding process is a result of one or more of the set of multiple beams being at least partially blocked during the one or more downlink transmissions according to the configuration, and transmit a NACK and link adaptation information, where the NACK is based on the failure of the decoding process and the link adaptation information is based on determining whether the one or more of the set of multiple beams are at least partially blocked.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described herein. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code 935 including instructions that, when executed, cause the processor to perform various functions described herein. In some cases, the memory 930 may contain, among other things, a basic input/output system (BIOS) which may control basic hardware or software operation such as the interaction with peripheral components or devices.

The processor 940 may include an intelligent hardware device, (e.g., a general-purpose processor, a digital signal processor (DSP), a CPU, a microcontroller, an ASIC, a field programmable gate array (FPGA), a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting link adaptation upon beam blocking determination).

The code 935 may include instructions to implement aspects of the present disclosure, including instructions to support wireless communications. The code 935 may be stored in a non-transitory computer-readable medium such as system memory or other type of memory. In some cases, the code 935 may not be directly executable by the processor 940 but may cause a computer (e.g., when compiled and executed) to perform functions described herein.

Figure 10:
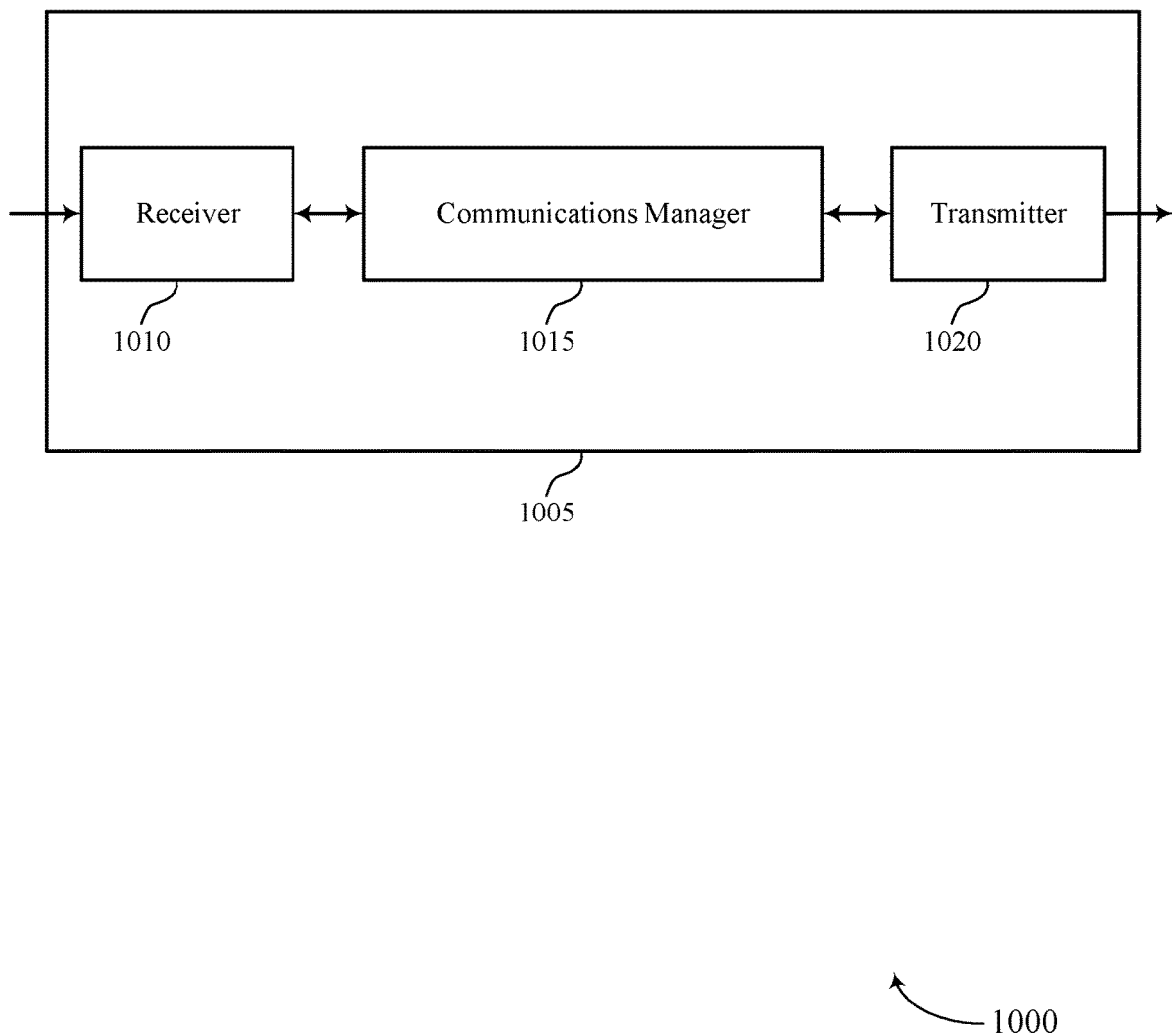
FIGS. 10 and 11 show block diagrams of devices that support link adaptation upon beam blocking determination in accordance with aspects of the present disclosure.

FIG. 10 shows a block diagram 1000 of a device 1005 that supports link adaptation upon beam blocking determination in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to link adaptation upon beam blocking determination, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may transmit a configuration for reporting feedback associated with beam blocking, transmit one or more downlink transmissions via a set of multiple beams, receive a NACK and link adaptation information according to the configuration, where the NACK is based on a failure of a decoding process and the link adaptation information is associated with at least one of the set of multiple beams, determine to retransmit at least one of the one or more downlink transmissions based on the NACK, and adjust a communication parameter for retransmission of the at least one of the one or more downlink transmissions based on the link adaptation information. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
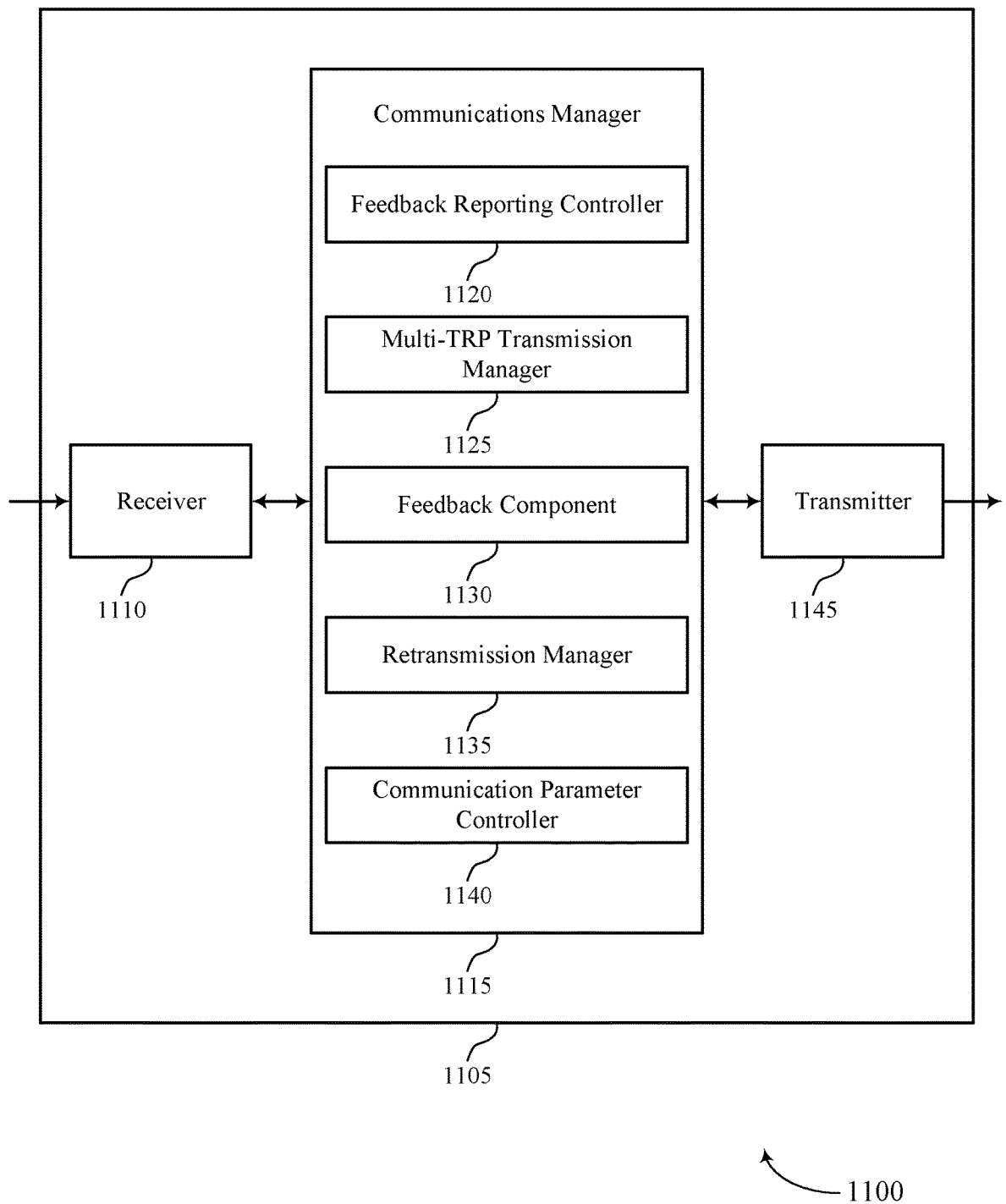

FIG. 11 shows a block diagram 1100 of a device 1105 that supports link adaptation upon beam blocking determination in accordance with aspects of the present disclosure. The device 1105 may be an example of aspects of a device 1005, or a base station 105 as described herein. The device 1105 may include a receiver 1110, a communications manager 1115, and a transmitter 1145. The device 1105 may also include a processor. Each of these components may be in communication with one another (e.g., via one or more buses).

The receiver 1110 may receive information such as packets, user data, or control information associated with various information channels (e.g., control channels, data channels, and information related to link adaptation upon beam blocking determination, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a feedback reporting controller 1120, a multi-TRP transmission manager 1125, a feedback component 1130, a retransmission manager 1135, and a communication parameter controller 1140. The communications manager 1115 may be an example of aspects of the communications manager 1310 described herein.

The feedback reporting controller 1120 may transmit a configuration for reporting feedback associated with beam blocking. The multi-TRP transmission manager 1125 may transmit one or more downlink transmissions via a set of multiple beams (e.g., where the one or more downlink transmissions may be transmitted via a respective set of transmit beams from the base station). The feedback component 1130 may receive a NACK and link adaptation information according to the configuration, where the NACK is based on a failure of a decoding process and the link adaptation information is associated with at least one of the set of multiple beams. The retransmission manager 1135 may determine to retransmit at least one of the one or more downlink transmissions based on the NACK. The communication parameter controller 1140 may adjust a communication parameter for retransmission of the at least one of the one or more downlink transmissions based on the link adaptation information.

The transmitter 1145 may transmit signals generated by other components of the device 1105. In some examples, the transmitter 1145 may be collocated with a receiver 1110 in a transceiver module. For example, the transmitter 1145 may be an example of aspects of the transceiver 1320 described with reference to FIG. 13. The transmitter 1145 may utilize a single antenna or a set of antennas.

Figure 12:
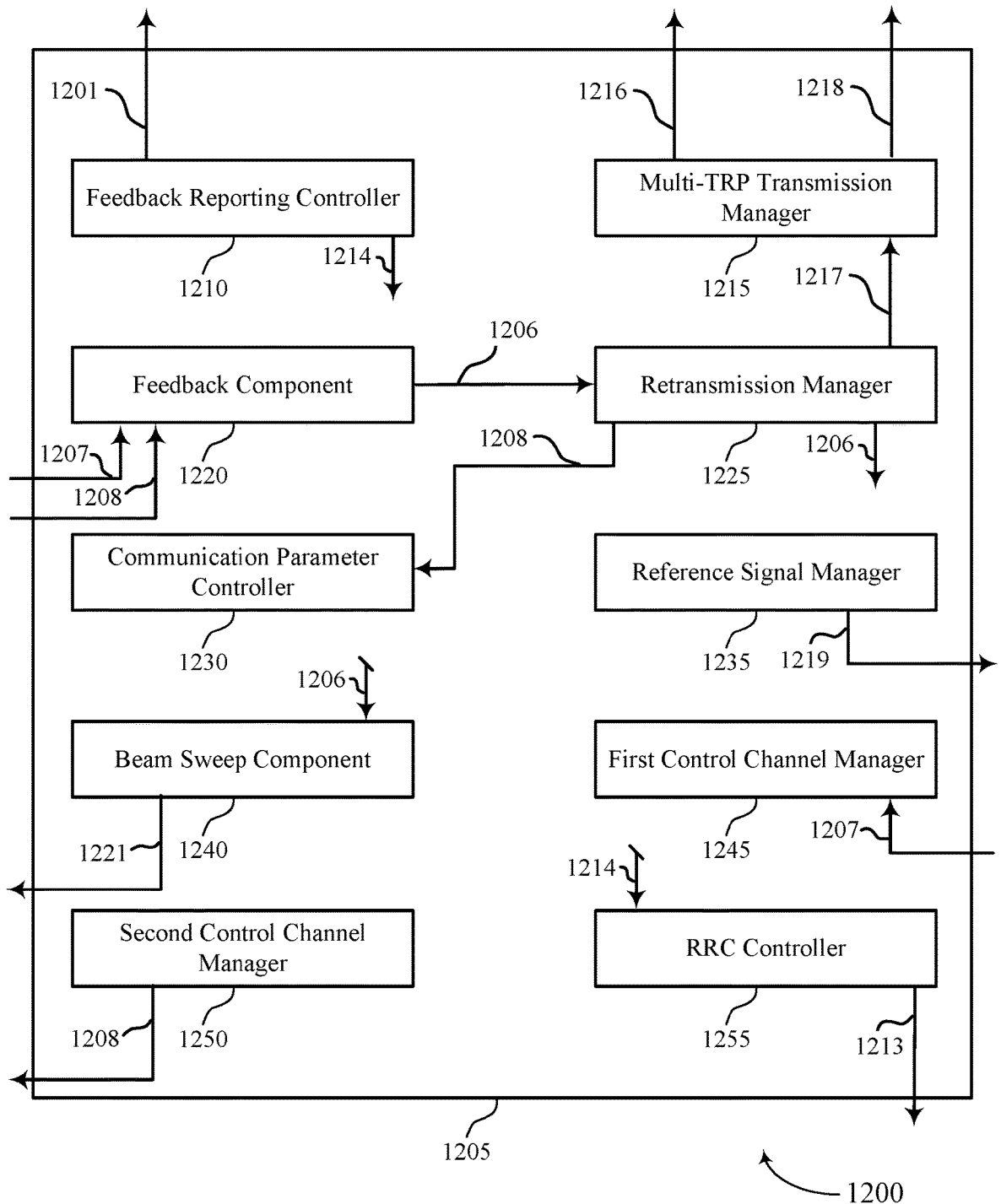
FIG. 12 shows a block diagram of a communications manager that supports link adaptation upon beam blocking determination in accordance with aspects of the present disclosure.

FIG. 12 shows a block diagram 1200 of a communications manager 1205 that supports link adaptation upon beam blocking determination in accordance with aspects of the present disclosure. The communications manager 1205 may be an example of aspects of a communications manager 1015, a communications manager 1115, or a communications manager 1310 described herein. The communications manager 1205 may include a feedback reporting controller 1210, a multi-TRP transmission manager 1215, a feedback component 1220, a retransmission manager 1225, a communication parameter controller 1230, a reference signal manager 1235, a beam sweep component 1240, a first control channel manager 1245, a second control channel manager 1250, and a RRC controller 1255. Each of these modules may communicate, directly or indirectly, with one another (e.g., via one or more buses).

The feedback reporting controller 1210 may transmit a configuration 1201 for reporting feedback associated with beam blocking. In some cases, the configuration 1201 may be included in an IE of an RRC message. For example, feedback reporting controller 1210 may pass IE information 1214 to the RRC controller 1255. RRC controller 1255 may generate the RRC message for transmission by transmitter 1145. In some cases, the configuration 1201 may be included in a message received from lower layers (e.g., a layer lower than an RRC protocol layer such as a MAC CE received from a MAC protocol layer). In some cases, the configuration 1201 for reporting feedback associated with beam blocking includes a first threshold associated with a beam blocking determination and a second threshold associated with a partial beam blocking determination.

The multi-TRP transmission manager 1215 may transmit one or more downlink transmissions via a set of multiple beams. For example, the downlink transmissions may be PDSCH transmissions. The multi-TRP transmission manager 1215 may prepare the PDSCH transmissions and pass beam transmission information 1216 to transmitter 1145 for the transmissions. In some cases, the set of downlink transmissions are transmitted semi-persistently via a respective set of beams.

The feedback component 1220 may receive a NACK 1207 and link adaptation information 1208 according to the configuration 1201, where the NACK 1207 is based on a failure of a decoding process and the link adaptation information 1208 is associated with at least one of the set of multiple beams. In some examples, the feedback component 1220 may receive, via at least one of a set of uplink beams of a beam sweep, the NACK 1207 and the link adaptation information 1208 based on whether the one or more of the set of transmit beams are at least partially blocked. In some cases, the feedback component 1220 may obtain the NACK 1207 and the link adaptation information 1208 from receiver 1110, which may receive signals corresponding to NACK 1207 and link adaptation information 1208 from a UE. The feedback component 1220 may pass beam blocking information 1206 to the retransmission manager 1225. In some cases, a single control information message includes the NACK 1207 and the link adaptation information 1208.

The retransmission manager 1225 may determine to retransmit at least one of the one or more downlink transmissions based on the NACK 1207. For example, retransmission manager 1225 may make the determination based on beam blocking information 1206 (e.g., the NACK 1207 identified in the beam blocking information 1206). In some examples, the retransmission manager 1225 may retransmit the at least one of the set of downlink transmissions according to the communication parameter. For example, the retransmission manager 1225 may pass retransmission information 1217 to the multi-TRP transmission manager 1215, which may prepare a PDSCH retransmission and pass beam retransmission information 1218 to transmitter 1145 for the transmissions.

The communication parameter controller 1230 may adjust a communication parameter for retransmission of the at least one of the one or more downlink transmissions based on the link adaptation information 1208. In some cases, the retransmission manager 1225 may pass the link adaptation information 1208 (e.g., received via beam blocking information 1206) to the communication parameter controller 1230. In some cases, the link adaptation information 1208 includes a request for at least one new downlink beam, and where the communication parameter includes at least one TCI state. In some cases, the link adaptation information 1208 includes a request for at least one new downlink beam and reuse of an MCS, and where the communication parameter includes at least one TCI state. In some cases, the link adaptation information includes 1208 a request for updating an MCS and reuse of the set of multiple beams, and where the communication parameter includes the MCS.

The reference signal manager 1235 may transmit a reference signal. For example, the reference signal manager 1235 may prepare the reference signal transmission (e.g., a DM-RS, PT-RS, or CSI-RS) and pass reference signal transmission information 1219 to transmitter 1145 for the transmission.

The beam sweep component 1240 may perform a downlink beam sweep procedure for the retransmission of the at least one of the one or more downlink transmissions based on the NACK 1207 and the link adaptation information 1208. For example, the beam sweep component 1240 may prepare the beam sweep transmission and pass beam sweep transmission information 1221 to transmitter 1145 for the transmission. In some cases, the retransmission manager 1225 may pass the beam blocking information 1206 (e.g., the NACK 1207 and link adaptation information 1208) to the beam sweep component 1240.

The first control channel manager 1245 may receive the NACK 1207 in a first control channel message. For example, first control channel manager 1245 may obtain the NACK 1207 from receiver 1110, which may receive signals corresponding to NACK 1207 from the UE.

The second control channel manager 1250 may receive the link adaptation information 1208 in a second control channel message. For example, second control channel manager 1250 may obtain the link adaptation information 1208 from receiver 1110, which may receive signals corresponding to link adaptation information 1208 from a UE.

The RRC controller 1255 may transmit a RRC message including an IE for reporting feedback associated with beam blocking. For example, the RRC controller 1255 may pass RRC message 1213 to transmitter 1145 for the transmission. In some cases, the RRC controller 1255 may obtain IE information 1214 from feedback reporting controller 1210. In some cases, the IE information 1214 may provide the configuration for reporting feedback associated with beam blocking to the UE.

Figure 13:
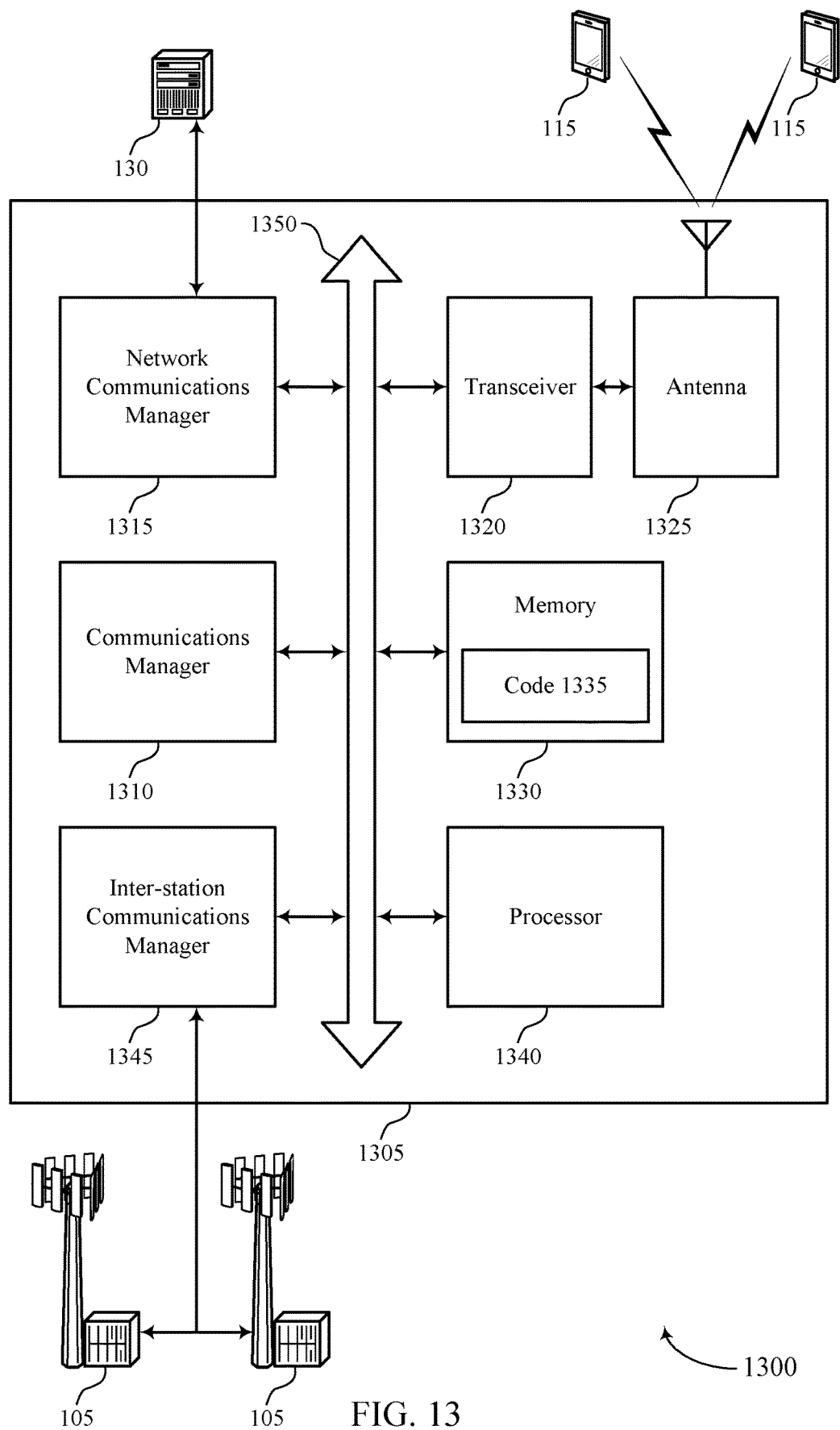
FIG. 13 shows a diagram of a system including a device that supports link adaptation upon beam blocking determination in accordance with aspects of the present disclosure.

FIG. 13 shows a diagram of a system 1300 including a device 1305 that supports link adaptation upon beam blocking determination in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may transmit a configuration for reporting feedback associated with beam blocking, transmit one or more downlink transmissions via a set of multiple beams, receive a NACK and link adaptation information according to the configuration, where the NACK is based on a failure of a decoding process and the link adaptation information is associated with at least one of the set of multiple beams, determine to retransmit at least one of the one or more downlink transmissions based on the NACK, and adjust a communication parameter for retransmission of the at least one of the one or more downlink transmissions based on the link adaptation information.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described herein. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting link adaptation upon beam blocking determination).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The code 1335 may include instructions to implement aspects of the present disclosure, including instructions to support wireless communications. The code 1335 may be stored in a non-transitory computer-readable medium such as system memory or other type of memory. In some cases, the code 1335 may not be directly executable by the processor 1340 but may cause a computer (e.g., when compiled and executed) to perform functions described herein.

Figure 14:
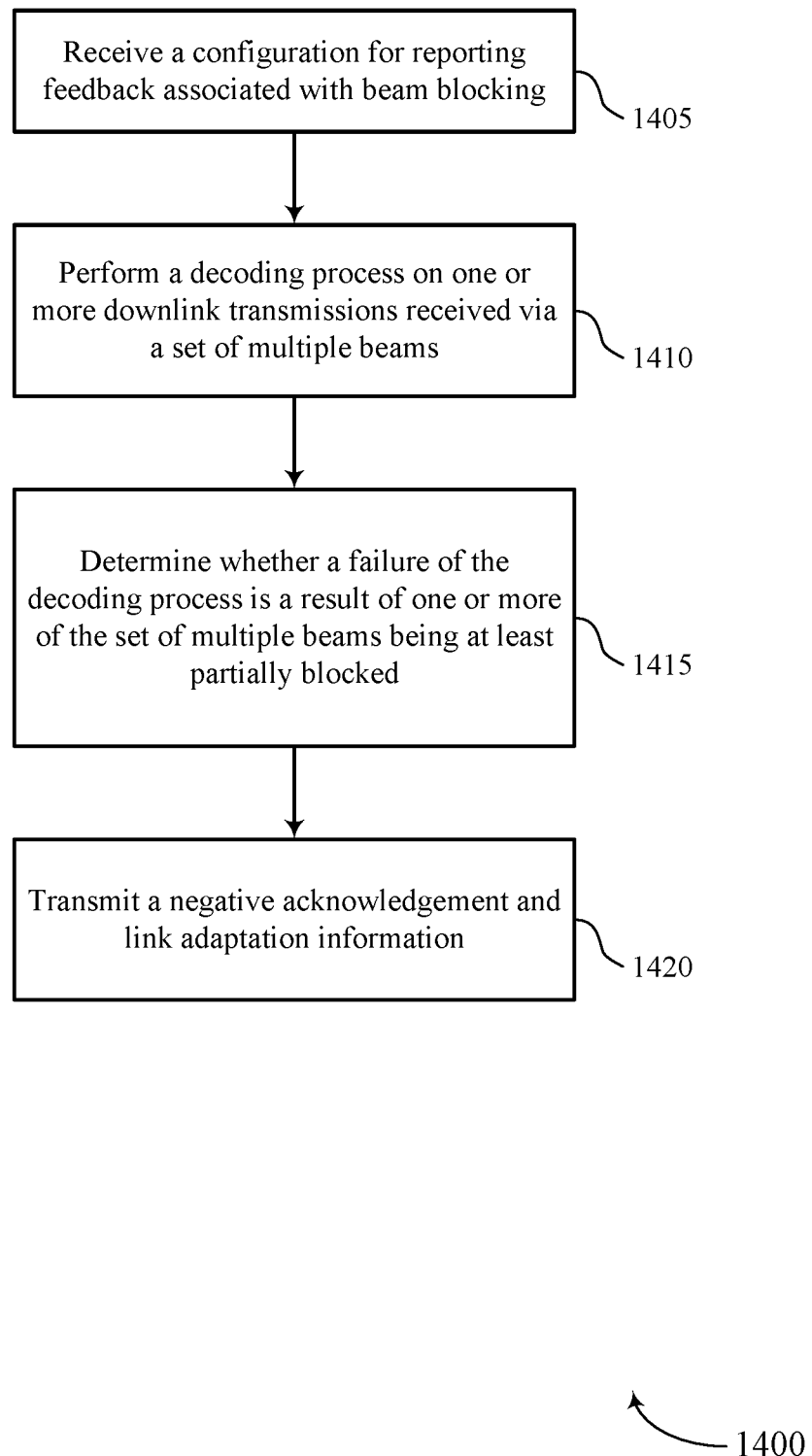
FIGS. 14 through 20 show flowcharts illustrating methods that support link adaptation upon beam blocking determination in accordance with aspects of the present disclosure.

FIG. 14 shows a flowchart illustrating a method 1400 that supports link adaptation upon beam blocking determination in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1405, the UE may receive a configuration for reporting feedback associated with beam blocking. The operations of 1405 may be performed according to the methods described herein. In some examples, aspects of the operations of 1405 may be performed by a feedback reporting manager as described with reference to FIGS. 6 through 9.

At 1410, the UE may perform a decoding process on one or more downlink transmissions received via a set of multiple beams. The operations of 1410 may be performed according to the methods described herein. In some examples, aspects of the operations of 1410 may be performed by a decoder as described with reference to FIGS. 6 through 9.

At 1415, the UE may determine whether a failure of the decoding process is a result of one or more of the set of multiple beams being at least partially blocked during the one or more downlink transmissions according to the configuration. The operations of 1415 may be performed according to the methods described herein. In some examples, aspects of the operations of 1415 may be performed by a beam blocking component as described with reference to FIGS. 6 through 9.

At 1420, the UE may transmit a NACK and link adaptation information, where the NACK is based on the failure of the decoding process and the link adaptation information is based on determining whether the one or more of the set of multiple beams are at least partially blocked. The operations of 1420 may be performed according to the methods described herein. In some examples, aspects of the operations of 1420 may be performed by a feedback component as described with reference to FIGS. 6 through 9.

Figure 15:
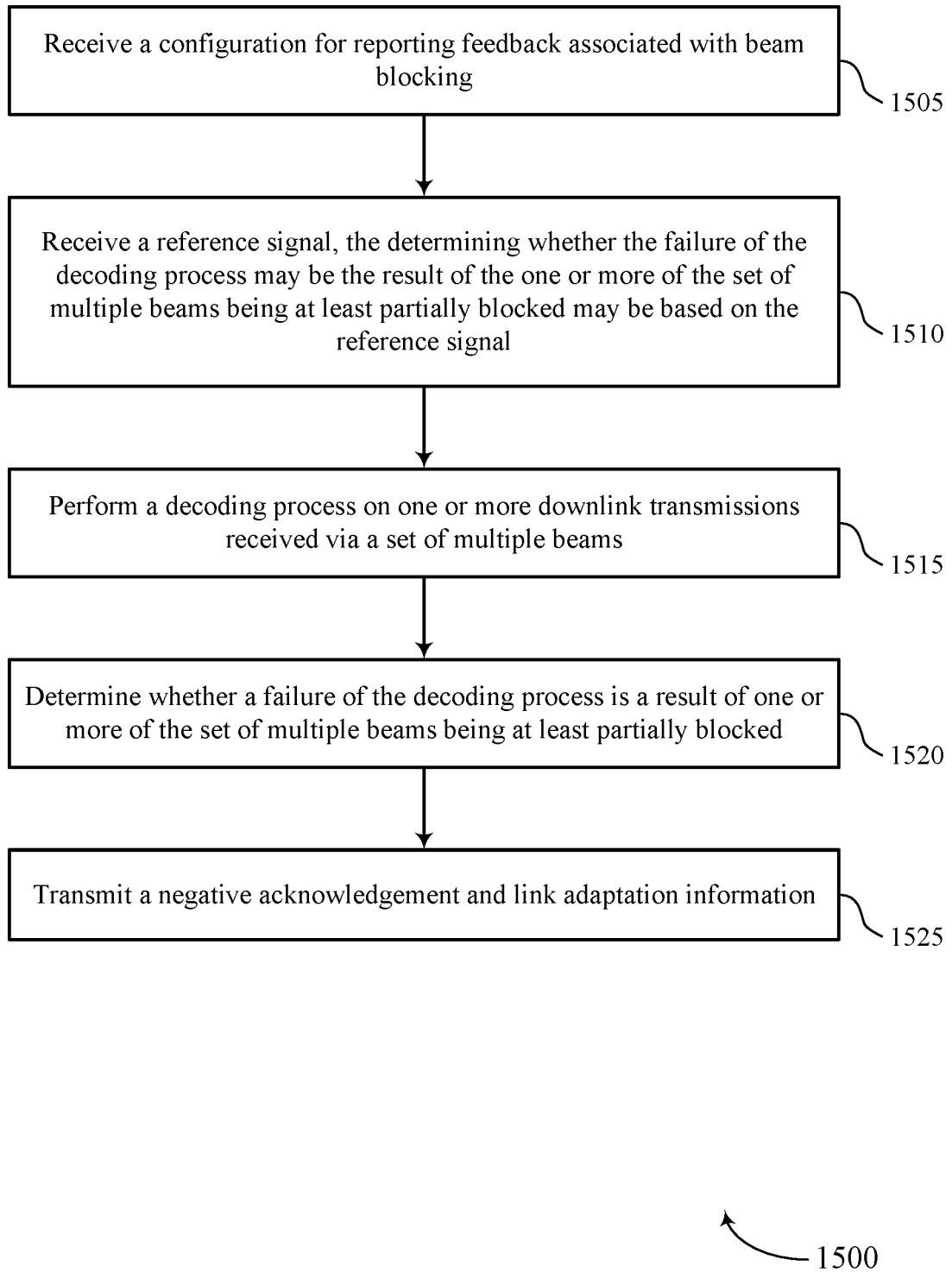

FIG. 15 shows a flowchart illustrating a method 1500 that supports link adaptation upon beam blocking determination in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1505, the UE may receive a configuration for reporting feedback associated with beam blocking. The operations of 1505 may be performed according to the methods described herein. In some examples, aspects of the operations of 1505 may be performed by a feedback reporting manager as described with reference to FIGS. 6 through 9.

At 1510, the UE may receive receiving a reference signal, where the determining whether the failure of the decoding process may be the result of the one or more of the set of multiple beams being at least partially blocked during the one or more downlink transmissions according to the configuration may be based on the reference signal. The operations of 1510 may be performed according to the methods described herein. In some examples, aspects of the operations of 1510 may be performed by a reference signal manager as described with reference to FIGS. 6 through 9.

At 1515, the UE may perform a decoding process on one or more downlink transmissions received via a set of multiple beams. The operations of 1515 may be performed according to the methods described herein. In some examples, aspects of the operations of 1515 may be performed by a decoder as described with reference to FIGS. 6 through 9.

At 1520, the UE may determine whether a failure of the decoding process is a result of one or more of the set of multiple beams being at least partially blocked during the one or more downlink transmissions according to the configuration. The operations of 1520 may be performed according to the methods described herein. In some examples, aspects of the operations of 1520 may be performed by a beam blocking component as described with reference to FIGS. 6 through 9.

At 1525, the UE may transmit a NACK and link adaptation information, where the NACK is based on the failure of the decoding process and the link adaptation information is based on determining whether the one or more of the set of multiple beams are at least partially blocked. The operations of 1525 may be performed according to the methods described herein. In some examples, aspects of the operations of 1525 may be performed by a feedback component as described with reference to FIGS. 6 through 9.

Figure 16:
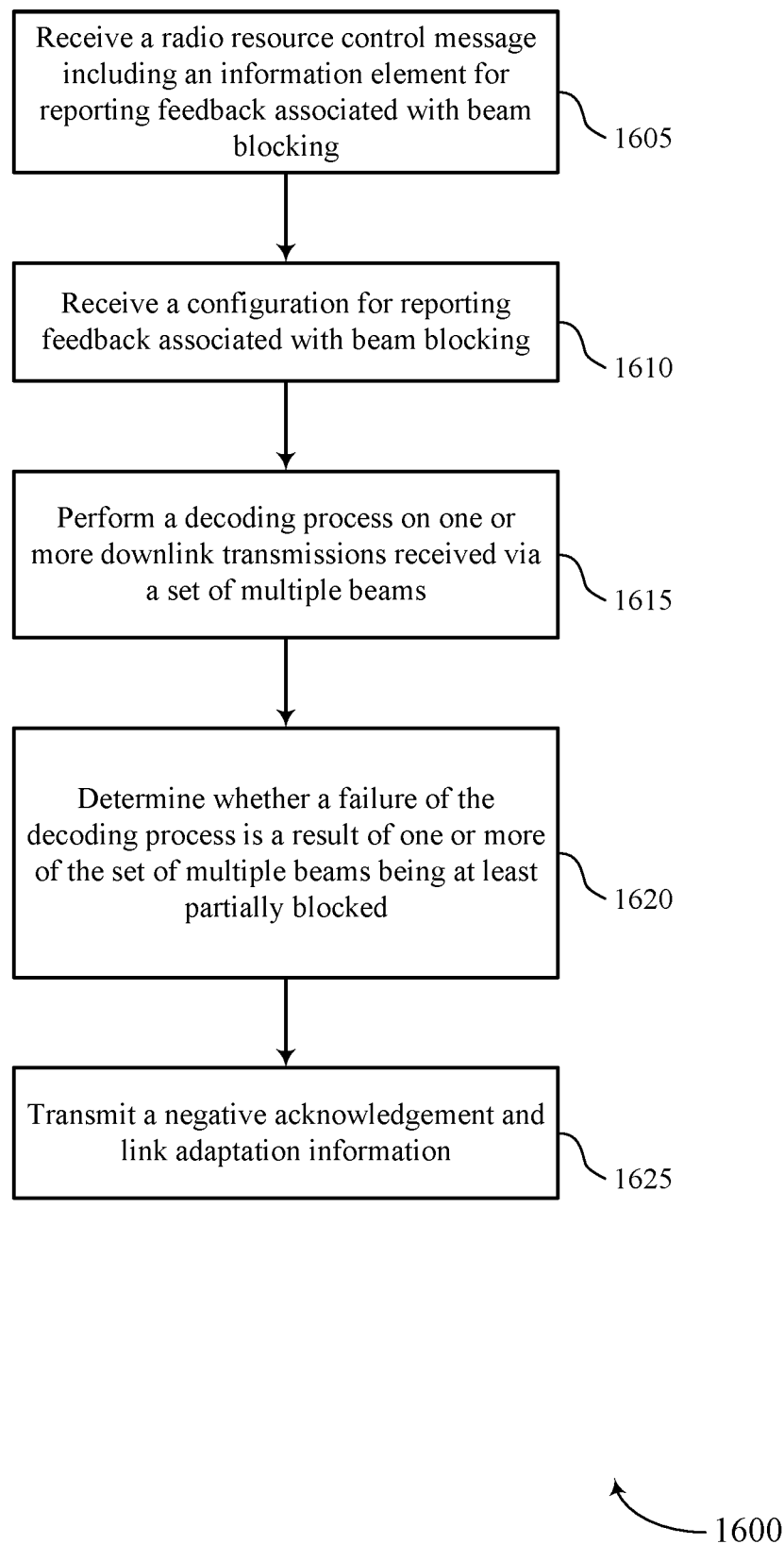

FIG. 16 shows a flowchart illustrating a method 1600 that supports link adaptation upon beam blocking determination in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described herein. Additionally, or alternatively, a UE may perform aspects of the functions described herein using special-purpose hardware.

At 1605, the UE may receive an RRC message including an IE for reporting feedback associated with beam blocking. The operations of 1605 may be performed according to the methods described herein. In some examples, aspects of the operations of 1605 may be performed by a RRC controller as described with reference to FIGS. 6 through 9.

At 1610, the UE may receive a configuration for reporting feedback associated with beam blocking. The operations of 1610 may be performed according to the methods described herein. In some examples, aspects of the operations of 1610 may be performed by a feedback reporting manager as described with reference to FIGS. 6 through 9.

At 1615, the UE may perform a decoding process on one or more downlink transmissions received via a set of multiple beams. The operations of 1615 may be performed according to the methods described herein. In some examples, aspects of the operations of 1615 may be performed by a decoder as described with reference to FIGS. 6 through 9.

At 1620, the UE may determine whether a failure of the decoding process is a result of one or more of the set of multiple beams being at least partially blocked during the one or more downlink transmissions according to the configuration. The operations of 1620 may be performed according to the methods described herein. In some examples, aspects of the operations of 1620 may be performed by a beam blocking component as described with reference to FIGS. 6 through 9.

At 1625, the UE may transmit a NACK and link adaptation information, where the NACK is based on the failure of the decoding process and the link adaptation information is based on determining whether the one or more of the set of multiple beams are at least partially blocked. The operations of 1625 may be performed according to the methods described herein. In some examples, aspects of the operations of 1625 may be performed by a feedback component as described with reference to FIGS. 6 through 9.

Figure 17:
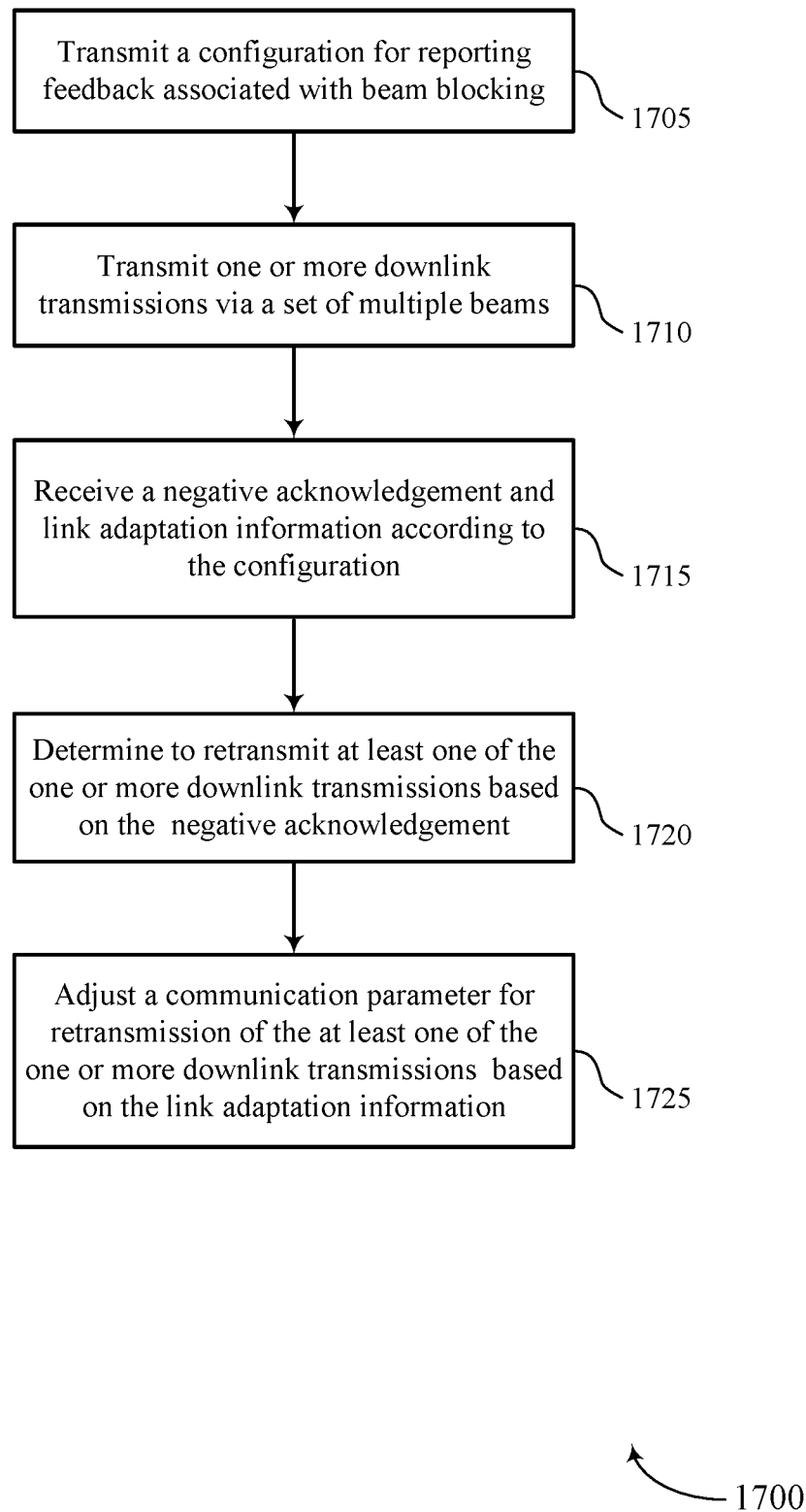

FIG. 17 shows a flowchart illustrating a method 1700 that supports link adaptation upon beam blocking determination in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1705, the base station may transmit a configuration for reporting feedback associated with beam blocking. The operations of 1705 may be performed according to the methods described herein. In some examples, aspects of the operations of 1705 may be performed by a feedback reporting controller as described with reference to FIGS. 10 through 13.

At 1710, the base station may transmit one or more downlink transmissions via a set of multiple beams. The operations of 1710 may be performed according to the methods described herein. In some examples, aspects of the operations of 1710 may be performed by a multi-TRP transmission manager as described with reference to FIGS. 10 through 13.

At 1715, the base station may receive a NACK and link adaptation information according to the configuration, where the NACK is based on a failure of a decoding process and the link adaptation information is associated with at least one of the set of multiple beams. The operations of 1715 may be performed according to the methods described herein. In some examples, aspects of the operations of 1715 may be performed by a feedback component as described with reference to FIGS. 10 through 13.

At 1720, the base station may determine to retransmit at least one of the one or more downlink transmissions based on the NACK. The operations of 1720 may be performed according to the methods described herein. In some examples, aspects of the operations of 1720 may be performed by a retransmission manager as described with reference to FIGS. 10 through 13.

At 1725, the base station may adjust a communication parameter for retransmission of the at least one of the one or more downlink transmissions based on the link adaptation information. The operations of 1725 may be performed according to the methods described herein. In some examples, aspects of the operations of 1725 may be performed by a communication parameter controller as described with reference to FIGS. 10 through 13.

Figure 18:
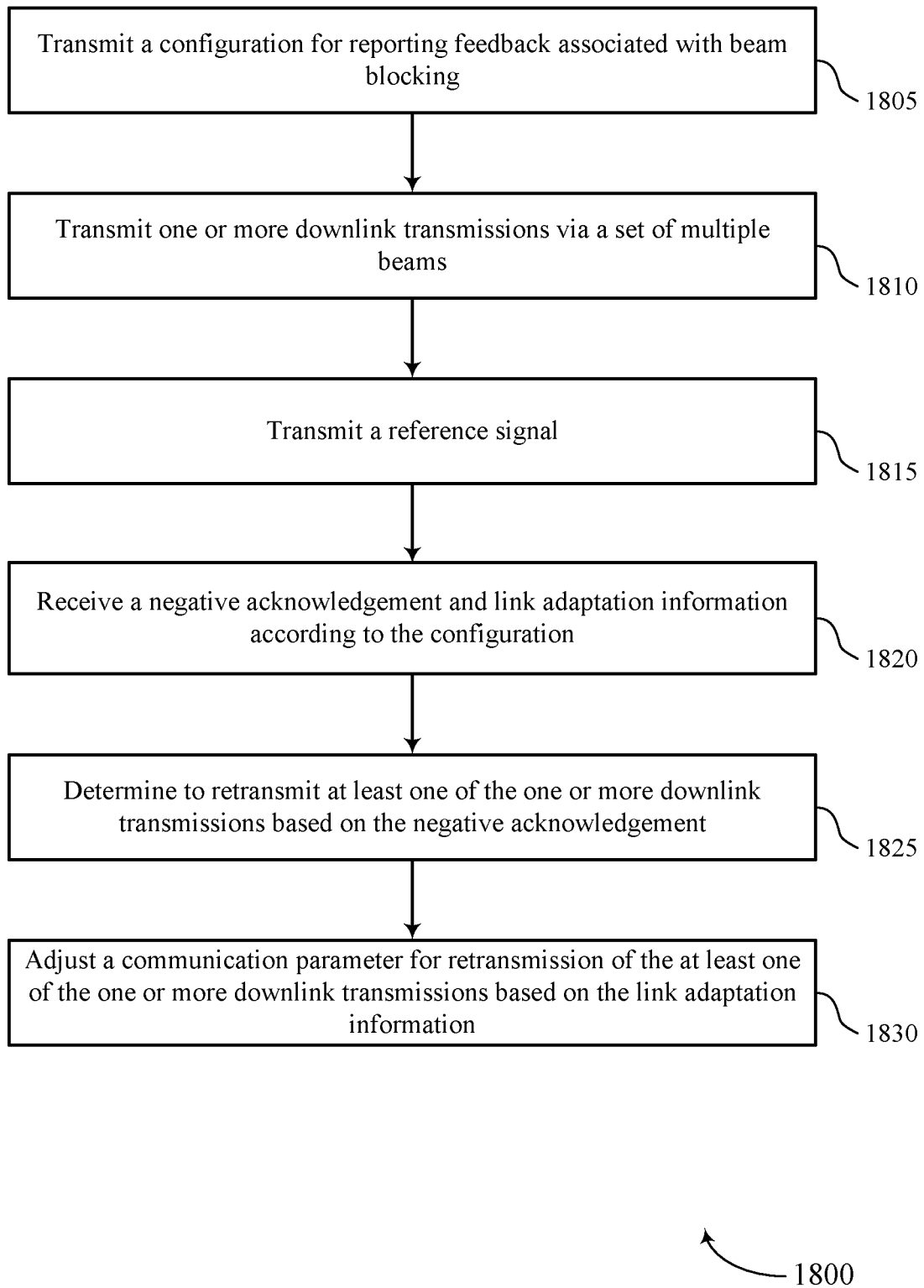

FIG. 18 shows a flowchart illustrating a method 1800 that supports link adaptation upon beam blocking determination in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1805, the base station may transmit a configuration for reporting feedback associated with beam blocking. The operations of 1805 may be performed according to the methods described herein. In some examples, aspects of the operations of 1805 may be performed by a feedback reporting controller as described with reference to FIGS. 10 through 13.

At 1810, the base station may transmit one or more downlink transmissions via a set of multiple beams. The operations of 1810 may be performed according to the methods described herein. In some examples, aspects of the operations of 1810 may be performed by a multi-TRP transmission manager as described with reference to FIGS. 10 through 13.

At 1815, the base station may transmit a reference signal. The operations of 1815 may be performed according to the methods described herein. In some examples, aspects of the operations of 1815 may be performed by a reference signal manager as described with reference to FIGS. 10 through 13.

At 1820, the base station may receive a NACK and link adaptation information according to the configuration, where the NACK is based on a failure of a decoding process and the link adaptation information is associated with at least one of the set of multiple beams. The operations of 1820 may be performed according to the methods described herein. In some examples, aspects of the operations of 1820 may be performed by a feedback component as described with reference to FIGS. 10 through 13.

At 1825, the base station may determine to retransmit at least one of the one or more downlink transmissions based on the NACK. The operations of 1825 may be performed according to the methods described herein. In some examples, aspects of the operations of 1825 may be performed by a retransmission manager as described with reference to FIGS. 10 through 13.

At 1830, the base station may adjust a communication parameter for retransmission of the at least one of the one or more downlink transmissions based on the link adaptation information. The operations of 1830 may be performed according to the methods described herein. In some examples, aspects of the operations of 1830 may be performed by a communication parameter controller as described with reference to FIGS. 10 through 13.

Figure 19:
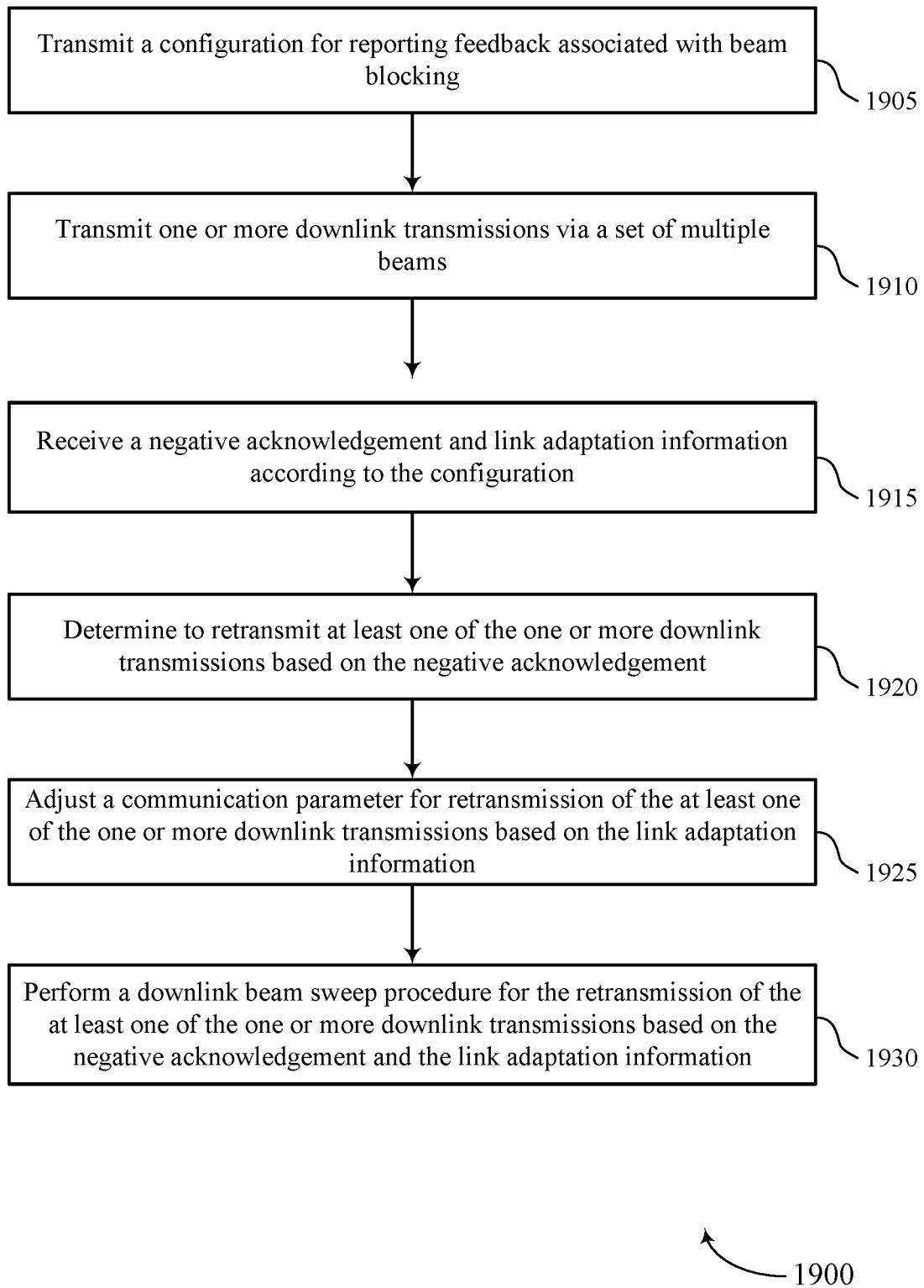

FIG. 19 shows a flowchart illustrating a method 1900 that supports link adaptation upon beam blocking determination in accordance with aspects of the present disclosure. The operations of method 1900 may be implemented by a base station 105 or its components as described herein. For example, the operations of method 1900 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 1905, the base station may transmit a configuration for reporting feedback associated with beam blocking. The operations of 1905 may be performed according to the methods described herein. In some examples, aspects of the operations of 1905 may be performed by a feedback reporting controller as described with reference to FIGS. 10 through 13.

At 1910, the base station may transmit one or more downlink transmissions via a set of multiple beams. The operations of 1910 may be performed according to the methods described herein. In some examples, aspects of the operations of 1910 may be performed by a multi-TRP transmission manager as described with reference to FIGS. 10 through 13.

At 1915, the base station may receive a NACK and link adaptation information according to the configuration, where the NACK is based on a failure of a decoding process and the link adaptation information is associated with at least one of the set of multiple beams. The operations of 1915 may be performed according to the methods described herein. In some examples, aspects of the operations of 1915 may be performed by a feedback component as described with reference to FIGS. 10 through 13.

At 1920, the base station may determine to retransmit at least one of the one or more downlink transmissions based on the NACK. The operations of 1920 may be performed according to the methods described herein. In some examples, aspects of the operations of 1920 may be performed by a retransmission manager as described with reference to FIGS. 10 through 13.

At 1925, the base station may adjust a communication parameter for retransmission of the at least one of the one or more downlink transmissions based on the link adaptation information. The operations of 1925 may be performed according to the methods described herein. In some examples, aspects of the operations of 1925 may be performed by a communication parameter controller as described with reference to FIGS. 10 through 13.

At 1930, the base station may perform a downlink beam sweep procedure for the retransmission of the at least one of the set of downlink transmissions based on the NACK and the link adaptation information. The operations of 1930 may be performed according to the methods described herein. In some examples, aspects of the operations of 1930 may be performed by a beam sweep component as described with reference to FIGS. 10 through 13.

Figure 20:
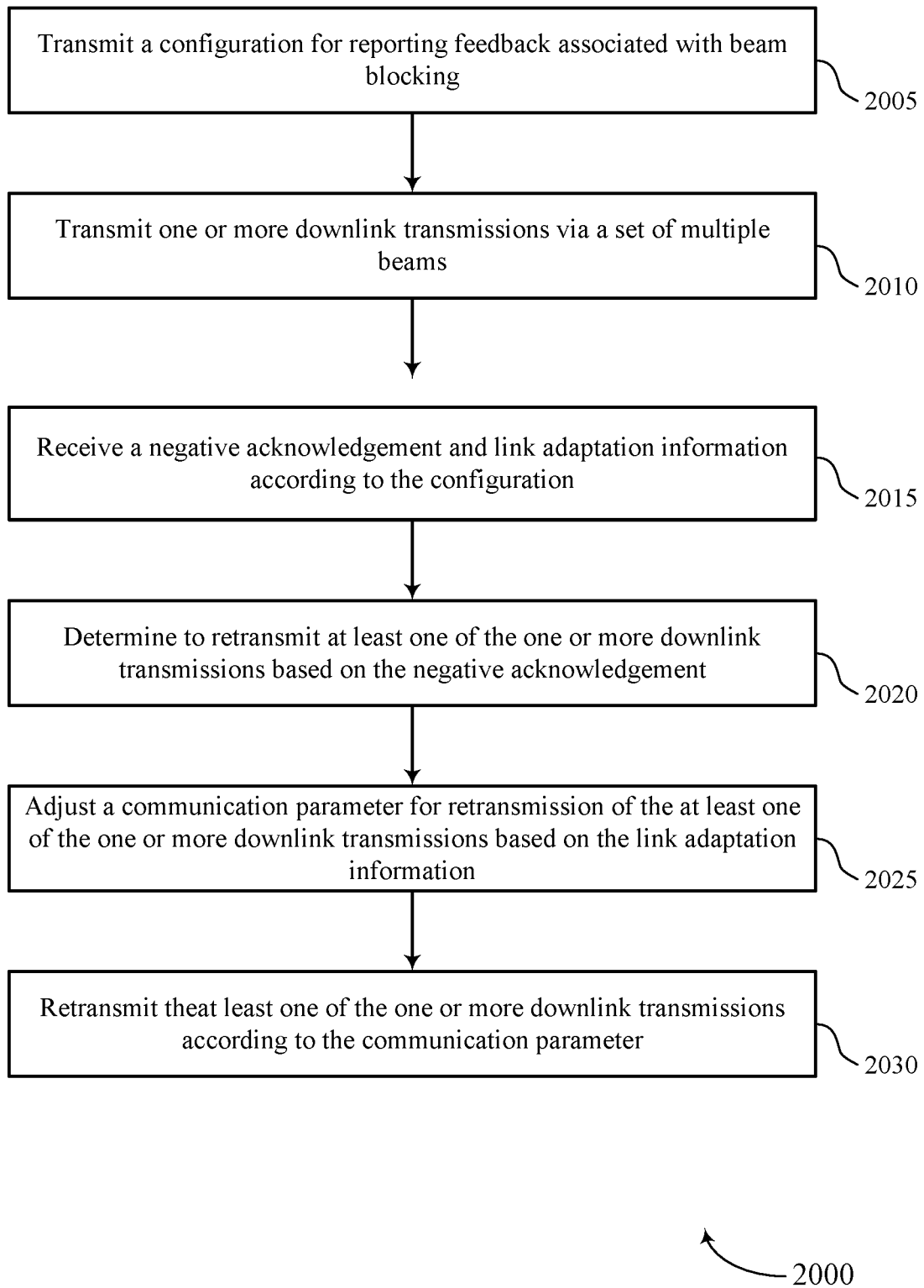

FIG. 20 shows a flowchart illustrating a method 2000 that supports link adaptation upon beam blocking determination in accordance with aspects of the present disclosure. The operations of method 2000 may be implemented by a base station 105 or its components as described herein. For example, the operations of method 2000 may be performed by a communications manager as described with reference to FIGS. 10 through 13. In some examples, a base station may execute a set of instructions to control the functional elements of the base station to perform the functions described herein. Additionally, or alternatively, a base station may perform aspects of the functions described herein using special-purpose hardware.

At 2005, the base station may transmit a configuration for reporting feedback associated with beam blocking. The operations of 2005 may be performed according to the methods described herein. In some examples, aspects of the operations of 2005 may be performed by a feedback reporting controller as described with reference to FIGS. 10 through 13.

At 2010, the base station may transmit one or more downlink transmissions via a set of multiple beams. The operations of 2010 may be performed according to the methods described herein. In some examples, aspects of the operations of 2010 may be performed by a multi-TRP transmission manager as described with reference to FIGS. 10 through 13.

At 2015, the base station may receive a NACK and link adaptation information according to the configuration, where the NACK is based on a failure of a decoding process and the link adaptation information is associated with at least one of the set of multiple beams. The operations of 2015 may be performed according to the methods described herein. In some examples, aspects of the operations of 2015 may be performed by a feedback component as described with reference to FIGS. 10 through 13.

At 2020, the base station may determine to retransmit at least one of the one or more downlink transmissions based on the NACK. The operations of 2020 may be performed according to the methods described herein. In some examples, aspects of the operations of 2020 may be performed by a retransmission manager as described with reference to FIGS. 10 through 13.

At 2025, the base station may adjust a communication parameter for retransmission of the at least one of the one or more downlink transmissions based on the link adaptation information. The operations of 2025 may be performed according to the methods described herein. In some examples, aspects of the operations of 2025 may be performed by a communication parameter controller as described with reference to FIGS. 10 through 13.

At 2030, the base station may retransmit the at least one of the one or more downlink transmissions according to the communication parameter. The operations of 2030 may be performed according to the methods described herein. In some examples, aspects of the operations of 2030 may be performed by a retransmission manager as described with reference to FIGS. 10 through 13.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a configuration for reporting feedback associated with beam blocking; performing a decoding process on one or more downlink transmissions received via a plurality of beams; determining whether a failure of the decoding process is a result of one or more of the plurality of beams being at least partially blocked during the one or more downlink transmissions according to the configuration; and transmitting a NACK and link adaptation information, wherein the NACK is based at least in part on the failure of the decoding process and the link adaptation information is based at least in part on determining whether the one or more of the plurality of beams are at least partially blocked.

Aspect 2: The method of aspect 1, further comprising: receiving a reference signal, wherein the determining whether the failure of the decoding process is the result of the one or more of the plurality of beams being at least partially blocked during the one or more downlink transmissions according to the configuration is based at least in part on the reference signal, and wherein the determining whether the failure of the decoding process is the result of the one or more of the plurality of beams being at least partially blocked during the one or more downlink transmissions according to the configuration comprises: comparing a receive power of the reference signal to a threshold; and determining that the one or more of the plurality of beams are blocked based at least in part on the receive power satisfying the threshold.

Aspect 3: The method of aspect 1, further comprising: receiving a reference signal, wherein the determining whether the failure of the decoding process is the result of the one or more of the plurality of beams being at least partially blocked during the one or more downlink transmissions according to the configuration is based at least in part on the reference signal, and wherein the determining whether the failure of the decoding process is the result of the one or more of the plurality of beams being at least partially blocked during the one or more downlink transmissions according to the configuration comprises: comparing a receive power of the reference signal to a first threshold and a second threshold; and determining that the one or more of the plurality of beams are partially blocked based at least in part on the receive power satisfying the first threshold and the second threshold.

Aspect 4: The method of aspect 1, wherein transmitting the NACK and the link adaptation information further comprises: transmitting, via a plurality of uplink beams in a beam sweep, the NACK and the link adaptation information based at least in part on determining whether the one or more of the plurality of beams are at least partially blocked.

Aspect 5: The method of any of aspects 1 through 4, wherein the link adaptation information comprises at least one of a request for at least one new downlink beam, a request for at least one new downlink beam and reuse of an MCS, or a request for a new MCS and reuse of the plurality of beams.

Aspect 6: The method of any of aspects 1 through 5, wherein a single control channel message comprises the NACK and the link adaptation information.

Aspect 7: The method of any of aspects 1 through 5, wherein transmitting the NACK and the link adaptation information comprises: transmitting the NACK in a first control channel message; and transmitting the link adaptation information in a second control channel message.

Aspect 8: The method of any of aspects 1 through 7, wherein receiving the configuration for reporting feedback associated with beam blocking further comprises: receiving an RRC message comprising an IE for reporting feedback associated with beam blocking.

Aspect 9: The method of any of aspects 1 through 8, wherein the one or more downlink transmissions are semi-persistent transmissions received via the plurality of beams.

Aspect 10: A method for wireless communications at a base station, comprising: transmitting a configuration for reporting feedback associated with beam blocking; transmitting one or more downlink transmissions via a plurality of beams; receiving a NACK and link adaptation information according to the configuration, wherein the NACK is based at least in part on a failure of a decoding process and the link adaptation information is associated with at least one of the plurality of beams; determining to retransmit at least one of the one or more downlink transmissions based at least in part on the NACK; and adjusting a communication parameter for retransmission of the at least one of the one or more downlink transmissions based at least in part on the link adaptation information.

Aspect 11: The method of aspect 10, further comprising: performing a downlink beam sweep procedure for the retransmission of the at least one of the one or more downlink transmissions based at least in part on the NACK and the link adaptation information.

Aspect 12: The method of any of aspects 10 or 11, wherein the configuration for reporting feedback associated with beam blocking comprises a first threshold associated with a beam blocking determination and a second threshold associated with a partial beam blocking determination.

Aspect 13: The method of any of aspects 10 through 12, wherein receiving the NACK and the link adaptation information further comprises: receiving, via at least one of a plurality of uplink beams of a beam sweep, the NACK and the link adaptation information based at least in part on whether the one or more of the plurality of beams are at least partially blocked.

Aspect 14: The method of any of aspects 10 through 13, wherein the link adaptation information comprises a request for at least one new downlink beam, and the communication parameter comprises at least one TCI state.

Aspect 15: The method of any of aspects 10 through 13, wherein the link adaptation information comprises a request for at least one new downlink beam and reuse of an MCS, and the communication parameter comprises at least one TCI state.

Aspect 16: The method of any of aspects 10 through 13, wherein the link adaptation information comprises a request for updating an MCS and reuse of the plurality of beams, and the communication parameter comprises the MCS.

Aspect 17: The method of any of aspects 10 through 16, wherein a single control information message comprises the NACK and the link adaptation information.

Aspect 18: The method of any of aspects 10 through 16, wherein receiving the NACK and the link adaptation information further comprises: receiving the NACK in a first control channel message; and receiving the link adaptation information in a second control channel message.

Aspect 19: The method of any of aspects 10 through 18, wherein transmitting the configuration for reporting feedback associated with beam blocking further comprises: transmitting an RRC message comprising an IE for reporting feedback associated with beam blocking.

Aspect 20: An apparatus for wireless communications at a UE, comprising a processor; memory coupled with the processor; and instructions stored in the memory and executable by the processor to cause the apparatus to perform a method of any of aspects 1 through 9.

Aspect 21: An apparatus for wireless communications at a UE, comprising at least one means for performing a method of any of aspects 1 through 9.

Aspect 22: A non-transitory computer-readable medium storing code for wireless communications at a UE, the code comprising instructions executable by a processor to perform a method of any of aspects 1 through 9.

Aspect 23: An apparatus for wireless communications at a base station, comprising a processor; memory coupled with the processor; and instructions stored in the memory and executable by the processor to cause the apparatus to perform a method of any of aspects 10 through 19.

Aspect 24: An apparatus for wireless communications at a base station, comprising at least one means for performing a method of any of aspects 10 through 19.

Aspect 25: A non-transitory computer-readable medium storing code for wireless communications at a base station, the code comprising instructions executable by a processor to perform a method of any of aspects 10 through 19.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. An apparatus for wireless communications at a user equipment (UE), comprising:
   a processor;
   memory coupled with the processor; and
   instructions stored in the memory and executable by the processor to cause the apparatus to:
   receive a configuration for reporting feedback associated with beam blocking;
   perform a decoding process on one or more downlink transmissions received via a plurality of beams;
   determine, in accordance with the configuration, whether a failure of the decoding process is a result of one or more of the plurality of beams being at least partially blocked during the one or more downlink transmissions based at least in part on comparing a value associated with the one or more downlink transmissions to a plurality of thresholds; and transmit a negative acknowledgement and link adaptation information, wherein the negative acknowledgement is based at least in part on the failure of the decoding process and the link adaptation information is based at least in part on determining whether the one or more of the plurality of beams are at least partially blocked; and wherein the value comprises at least one of:
an average receive power of a reference signal across a system bandwidth;
a receive power of a reference signal associated with a resource block;
an average receive power of a reference signal taken over a coherence time; or
a difference between a receive power of a reference signal associated with a first time and a receive power of a reference signal associated with a second time.

2. The apparatus of claim 1, wherein the instructions are further executable by the processor to cause the apparatus to:
receive a reference signal, wherein determining whether the failure of the decoding process is the result of the one or more of the plurality of beams being at least partially blocked during the one or more downlink transmissions according to the configuration is based at least in part on the reference signal, and
wherein determining whether the failure of the decoding process is the result of the one or more of the plurality of beams being at least partially blocked during the one or more downlink transmissions according to the configuration comprises:
compare a receive power of the reference signal to a first threshold and a second threshold; and
determine that the one or more of the plurality of beams are partially blocked based at least in part on the receive power satisfying the first threshold and not satisfying the second threshold.

3. The apparatus of claim 1, wherein the instructions to transmit the negative acknowledgement and the link adaptation information are executable by the processor to cause the apparatus to:
transmit, via a plurality of uplink beams in a beam sweep, the negative acknowledgement and the link adaptation information based at least in part on determining whether the one or more of the plurality of beams are at least partially blocked.

4. The apparatus of claim 1, wherein the link adaptation information comprises a request for at least one new downlink beam or a request for at least one new downlink beam and reuse of a modulation and coding scheme.

5. The apparatus of claim 1, wherein the link adaptation information comprises a request for a new modulation and coding scheme and reuse of the plurality of beams.

6. The apparatus of claim 1, wherein a single control channel message comprises the negative acknowledgement and the link adaptation information.

7. The apparatus of claim 1, wherein the instructions to transmit the negative acknowledgement and the link adaptation information are executable by the processor to cause the apparatus to:
transmit the negative acknowledgement in a first control channel message; and
transmit the link adaptation information in a second control channel message.

8. The apparatus of claim 1, wherein the instructions to receive the configuration for reporting feedback associated with beam blocking are executable by the processor to cause the apparatus to:
receive a radio resource control message comprising an information element for reporting feedback associated with beam blocking.

9. The apparatus of claim 1, wherein the one or more downlink transmissions are semi-persistent transmissions received via the plurality of beams.

10. An apparatus for wireless communications at a base station, comprising:
a processor;
memory coupled with the processor; and
instructions stored in the memory and executable by the processor to cause the apparatus to:
transmit a configuration for reporting feedback associated with beam blocking;
transmit one or more downlink transmissions via a plurality of beams;
receive a negative acknowledgement and link adaptation information according to the configuration, wherein the negative acknowledgement is based at least in part on a failure of a decoding process and the link adaptation information is associated with at least one of the plurality of beams, wherein the failure of the decoding process is associated with a comparison of a value associated with the one or more downlink transmissions to a plurality of thresholds;
determine to retransmit at least one of the one or more downlink transmissions based at least in part on the negative acknowledgement; and
adjust a communication parameter for retransmission of the at least one of the one or more downlink transmissions based at least in part on the link adaptation information; and
wherein the value comprises at least one of:
an average receive power of a reference signal across a system bandwidth;
a receive power of a reference signal associated with a resource block;
an average receive power of a reference signal taken over a coherence time; or
a difference between a receive power of a reference signal associated with a first time and a receive power of a reference signal associated with a second time.

11. The apparatus of claim 10, wherein the instructions are further executable by the processor to cause the apparatus to:
perform a downlink beam sweep procedure for the retransmission of the at least one of the one or more downlink transmissions based at least in part on the negative acknowledgement and the link adaptation information.

12. The apparatus of claim 10, wherein the configuration for reporting feedback associated with beam blocking comprises a first threshold associated with a beam blocking determination and a second threshold associated with a partial beam blocking determination.

13. The apparatus of claim 10, wherein the instructions to receive the negative acknowledgement and the link adaptation information are executable by the processor to cause the apparatus to:
receive, via at least one of a plurality of uplink beams of a beam sweep, the negative acknowledgement and the link adaptation information based at least in part on whether the one or more of the plurality of beams are at least partially blocked.

14. The apparatus of claim 10, wherein:
the link adaptation information comprises a request for at least one new downlink beam, and
the communication parameter comprises at least one transmission configuration indicator state.

15. The apparatus of claim 10, wherein:
the link adaptation information comprises a request for at least one new downlink beam and reuse of a modulation and coding scheme, and
the communication parameter comprises at least one transmission configuration indicator state.

16. The apparatus of claim 10, wherein:
the link adaptation information comprises a request for updating a modulation and coding scheme and reuse of the plurality of beams, and
the communication parameter comprises the modulation and coding scheme.

17. The apparatus of claim 10, wherein a single control information message comprises the negative acknowledgement and the link adaptation information.

18. The apparatus of claim 10, wherein the instructions to receive the negative acknowledgement and the link adaptation information are executable by the processor to cause the apparatus to:
receive the negative acknowledgement in a first control channel message; and
receive the link adaptation information in a second control channel message.

19. The apparatus of claim 10, wherein the instructions to transmit the configuration for reporting feedback associated with beam blocking are executable by the processor to cause the apparatus to:
transmit a radio resource control message comprising an information element for reporting feedback associated with beam blocking.

20. A method for wireless communications at a user equipment (UE), comprising:
receiving a configuration for reporting feedback associated with beam blocking;
performing a decoding process on one or more downlink transmissions received via a plurality of beams;
determining, in accordance with the configuration, whether a failure of the decoding process is a result of one or more of the plurality of beams being at least partially blocked during the one or more downlink transmissions based at least in part on comparing a value associated with the one or more downlink transmissions to a plurality of thresholds; and
transmitting a negative acknowledgement and link adaptation information, wherein the negative acknowledgement is based at least in part on the failure of the decoding process and the link adaptation information is based at least in part on determining whether the one or more of the plurality of beams are at least partially blocked; and
wherein the value comprises at least one of:
an average receive power of a reference signal across a system bandwidth;
a receive power of a reference signal associated with a resource block;
an average receive power of a reference signal taken over a coherence time; or
a difference between a receive power of a reference signal associated with a first time and a receive power of a reference signal associated with a second time.

21. The method of claim 20, further comprising:
receiving a reference signal, wherein determining whether the failure of the decoding process is the result of the one or more of the plurality of beams being at least partially blocked during the one or more downlink transmissions according to the configuration is based at least in part on the reference signal, and
wherein determining whether the failure of the decoding process is the result of the one or more of the plurality of beams being at least partially blocked during the one or more downlink transmissions according to the configuration comprises:
comparing a receive power of the reference signal to a first threshold and a second threshold; and
determining that the one or more of the plurality of beams are partially blocked based at least in part on the receive power satisfying the first threshold and not satisfying the second threshold.

22. The method of claim 20, wherein transmitting the negative acknowledgement and the link adaptation information comprises:
transmitting, via a plurality of uplink beams in a beam sweep, the negative acknowledgement and the link adaptation information based at least in part on determining whether the one or more of the plurality of beams are at least partially blocked.

23. The method of claim 20, wherein the link adaptation information comprises a request for at least one new downlink beam or a request for at least one new downlink beam and reuse of a modulation and coding scheme.

24. The method of claim 20, wherein the link adaptation information comprises a request for a new modulation and coding scheme and reuse of the plurality of beams.

25. A method for wireless communications at a base station, comprising:
transmitting a configuration for reporting feedback associated with beam blocking;
transmitting one or more downlink transmissions via a plurality of beams;
receiving a negative acknowledgement and link adaptation information according to the configuration, wherein the negative acknowledgement is based at least in part on a failure of a decoding process and the link adaptation information is associated with at least one of the plurality of beams, wherein the failure of the decoding process is associated with a comparison of a value associated with the one or more downlink transmissions to a plurality of thresholds;
determining to retransmit at least one of the one or more downlink transmissions based at least in part on the negative acknowledgement; and
adjusting a communication parameter for retransmission of the at least one of the one or more downlink transmissions based at least in part on the link adaptation information; and
wherein the value comprises at least one of:
an average receive power of a reference signal across a system bandwidth;
a receive power of a reference signal associated with a resource block;
an average receive power of a reference signal taken over a coherence time; or a difference between a receive power of a reference signal associated with a first time and a receive power of a reference signal associated with a second time.

26. The method of claim 25, further comprising:
performing a downlink beam sweep procedure for the retransmission of the at least one of the one or more downlink transmissions based at least in part on the negative acknowledgement and the link adaptation information.

27. The method of claim 25, wherein the configuration for reporting feedback associated with beam blocking comprises a first threshold associated with a beam blocking determination and a second threshold associated with a partial beam blocking determination.

28. The method of claim 25, wherein receiving the negative acknowledgement and the link adaptation information comprises:
receiving, via at least one of a plurality of uplink beams of a beam sweep, the negative acknowledgement and the link adaptation information based at least in part on whether the one or more of the plurality of beams are at least partially blocked.

29. The apparatus of claim 1, wherein the value comprises a difference between a receive power of a reference signal associated with a first time and a receive power of a reference signal associated with a second time, and wherein the plurality of thresholds comprises one or more thresholds associated with one or more coherence times, wherein determining whether the failure of the decoding process is the result of the one or more of the plurality of beams being at least partially blocked during the one or more downlink transmissions is based at least in part on comparing the difference to the one or more thresholds associated with the one or more coherence times.

* * * * *